(12) United States Patent
Burnett

(10) Patent No.: US 10,150,066 B2
(45) Date of Patent: Dec. 11, 2018

(54) SCREEN ASSEMBLY AND A METHOD FOR MAKING SAME

(75) Inventor: George Alexander Burnett, Aberdeen (GB)

(73) Assignee: National Oilwell Varco, L.P., Houston, TX (US)

( * ) Notice: Subject to any disclaimer, the term of this patent is extended or adjusted under 35 U.S.C. 154(b) by 606 days.

(21) Appl. No.: 13/981,693

(22) PCT Filed: Jan. 10, 2012

(86) PCT No.: PCT/GB2012/050044
§ 371 (c)(1),
(2), (4) Date: Nov. 6, 2013

(87) PCT Pub. No.: WO2012/101418
PCT Pub. Date: Aug. 2, 2012

(65) Prior Publication Data
US 2014/0054216 A1    Feb. 27, 2014

(30) Foreign Application Priority Data
Jan. 27, 2011 (GB) .................................. 1101396.8

(51) Int. Cl.
*B01D 29/00* (2006.01)
*B01D 35/28* (2006.01)
(Continued)

(52) U.S. Cl.
CPC ................ *B01D 35/28* (2013.01); *B07B 1/28* (2013.01); *B07B 1/46* (2013.01); *B29C 45/14467* (2013.01)

(58) Field of Classification Search
None
See application file for complete search history.

(56) References Cited

U.S. PATENT DOCUMENTS 5,265,730 A    11/1993    Norris et al.
5,819,952 A    10/1998    Cook et al.
(Continued)

FOREIGN PATENT DOCUMENTS

EP    0356209    2/1990
GB    1526663    9/1978
(Continued)

OTHER PUBLICATIONS

International Search Report and Written Opinion for PCT Application No. PCT/GB2012/050044 dated Sep. 26, 2013, 15 pages.
(Continued)

*Primary Examiner* — Ana M Fortuna
(74) *Attorney, Agent, or Firm* — Conley Rose, P.C.

(57) ABSTRACT

A screen assembly for a shale shaker, the screen assembly including a support structure and at least one layer of screening material thereon. The support structure includes structural members having a thermal expansion coefficient and the at least one layer of screening material has a thermal expansion coefficient. The thermal expansion coefficient of the structural members is substantially equal to the thermal expansion coefficient of the at least one layer of screening material. A method for making a support structure for a screen assembly is also provided. The method includes placing at least one support member in a mold whereupon a flowable plastics material is injected into the mold, whereupon the flowable plastics material hardens, at least a portion of the flowable plastics material forming a brace.

15 Claims, 16 Drawing Sheets

(51) Int. Cl.
  *B07B 1/28* (2006.01)
  *B07B 1/46* (2006.01)
  *B29C 45/14* (2006.01)

(56) References Cited

U.S. PATENT DOCUMENTS

| | | | |
|---|---|---|---|
| 6,305,549 B1 | 10/2001 | Riddle et al. | |
| 6,565,698 B1* | 5/2003 | Adams | B01D 29/012 |
| | | | 156/290 |
| 6,675,975 B1 | 1/2004 | Cook et al. | |
| 6,692,599 B2 | 2/2004 | Cook et al. | |
| 6,713,190 B2 | 3/2004 | Cook et al. | |
| 6,759,000 B2 | 7/2004 | Cook et al. | |
| 6,800,163 B2 | 10/2004 | Cook et al. | |
| 8,597,559 B2 | 12/2013 | Robertson et al. | |
| 2002/0000399 A1* | 1/2002 | Winkler | B01D 29/012 |
| | | | 209/399 |
| 2002/0088747 A1 | 7/2002 | Cook et al. | |
| 2002/0104611 A1 | 8/2002 | Adams | |
| 2005/0236305 A1* | 10/2005 | Schulte, Jr. | B01D 29/012 |
| | | | 209/403 |
| 2007/0108107 A1 | 5/2007 | Morrow | |
| 2008/0078702 A1 | 4/2008 | Cady et al. | |
| 2008/0257791 A1 | 10/2008 | Malmberg | |
| 2009/0071879 A1 | 3/2009 | Helmy | |
| 2010/0089652 A1 | 4/2010 | Burnett | |
| 2010/0276343 A1 | 11/2010 | Hukki | |
| 2013/0105412 A1 | 5/2013 | Burnett | |
| 2014/0054216 A1* | 2/2014 | Burnett | B07B 1/28 |
| | | | 210/499 |

FOREIGN PATENT DOCUMENTS

| | | |
|---|---|---|
| GB | 1578948 | 11/1980 |
| GB | 2176424 | 12/1986 |
| GB | 2206501 | 1/1989 |
| GB | 2461727 | 1/2010 |
| WO | 9633792 | 10/1996 |
| WO | 9816328 | 4/1998 |
| WO | 0176720 | 10/2001 |
| WO | 03013690 | 2/2003 |
| WO | 2004035234 | 4/2004 |
| WO | 2004069374 | 8/2004 |
| WO | 2009101482 | 8/2009 |

OTHER PUBLICATIONS

PCT Partial Search Report, Invitation to Pay Additional Fees, International Application No. PCT/GB2012/050044, dated Dec. 11, 2012 (4 pages).
UK Search Report under Section 17(5), UK Patent Application No. GB1101396.8, dated May 24, 2011 (4 pages).
UK Examination Report under Section 18(3), UK Patent Application No. GB1101396.8, dated Oct. 12, 2012 (5 pages).
UK Examination Report under Section 18(3), UK Patent Application No. GB1101396.8, dated Nov. 15, 2012 (4 pages).
UK Combined Search and Examination Report under Sections 17 and 18(3), UK Patent Application No. GB11302013.6, dated Apr. 18, 2013 (5 pages).
Jan. 15, 2013 Response to UK Examination Report under Section 18(3), UK Patent Application No. GB1101396.8, dated Nov. 15, 2012 (2 pages).
Notification of Grant, UK Patent Application No. GB1101396.8, dated Apr. 23, 2013 (2 pages).

* cited by examiner

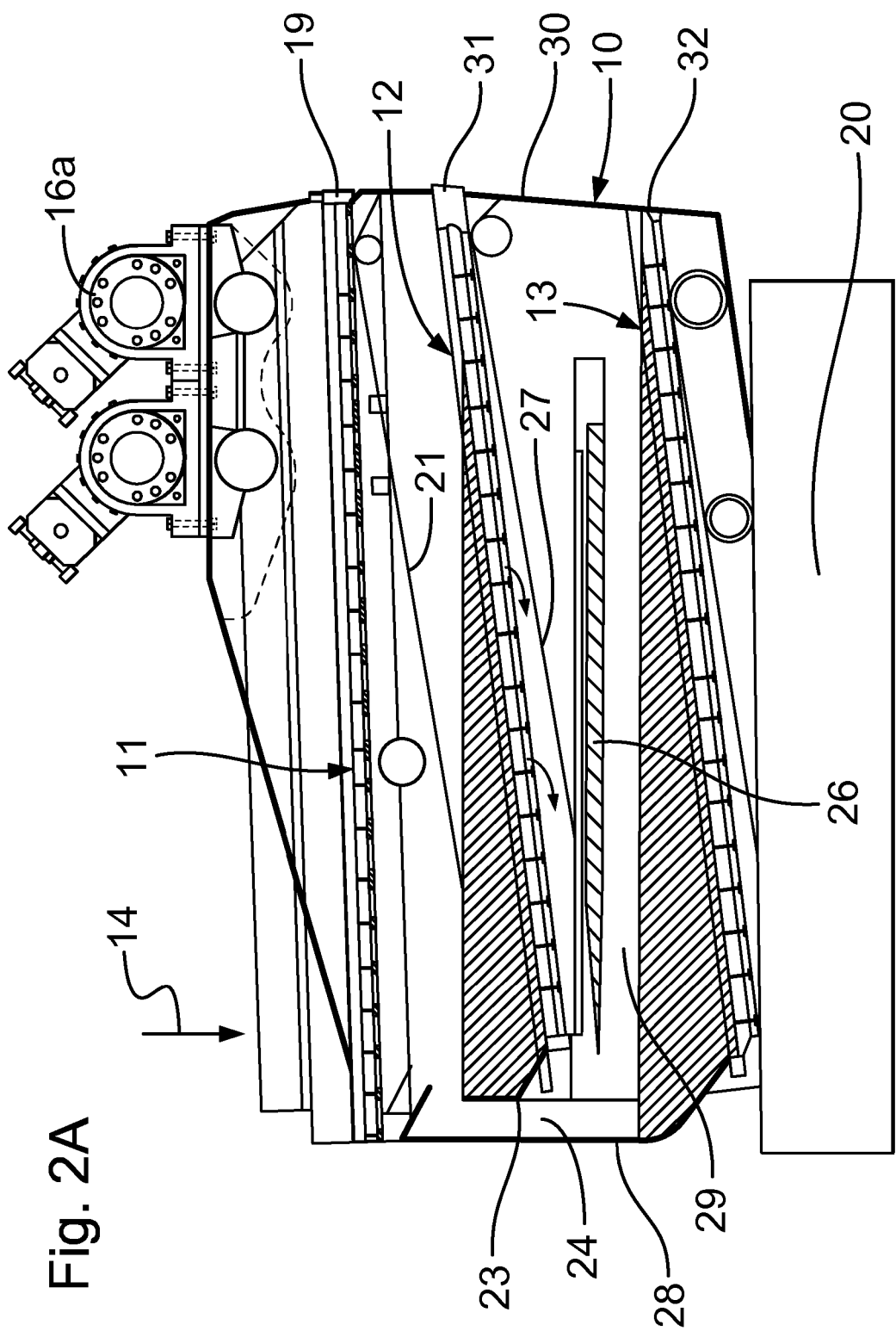

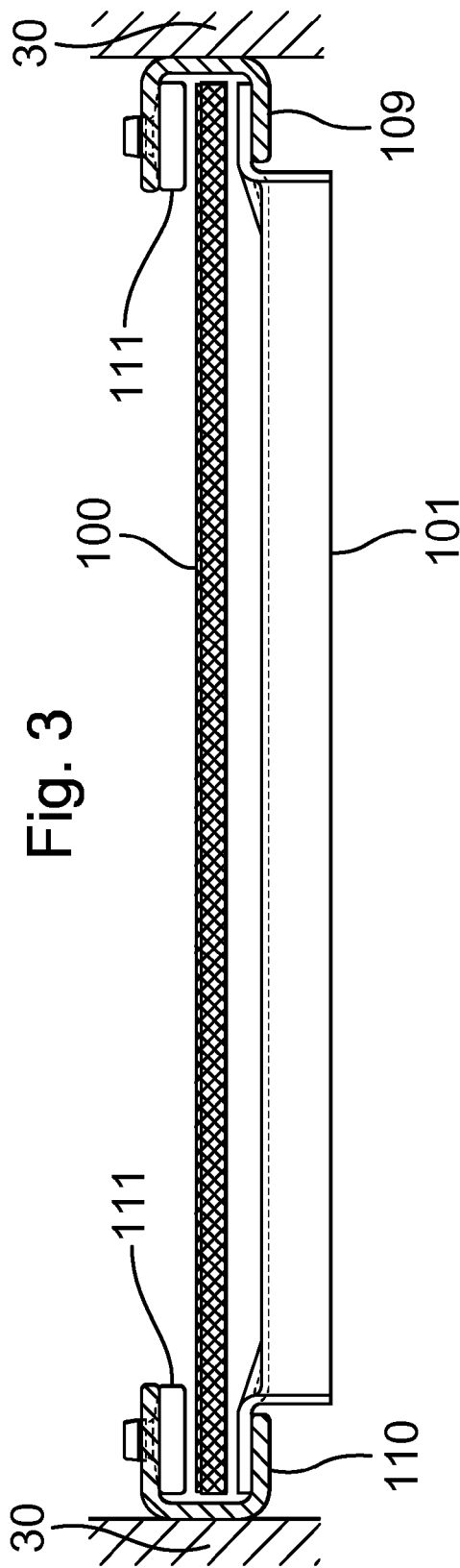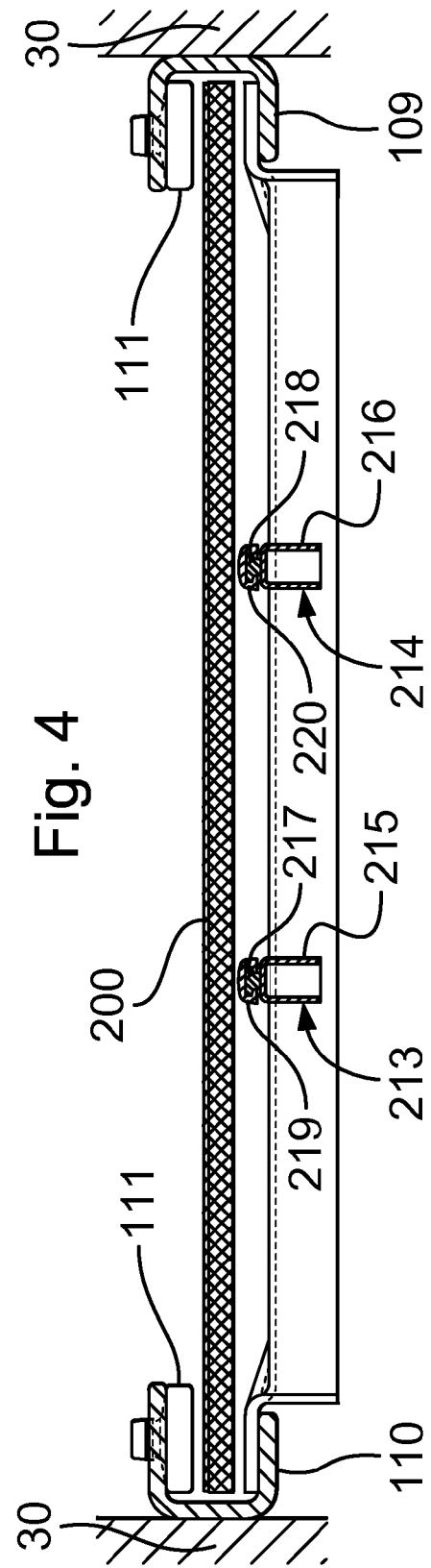

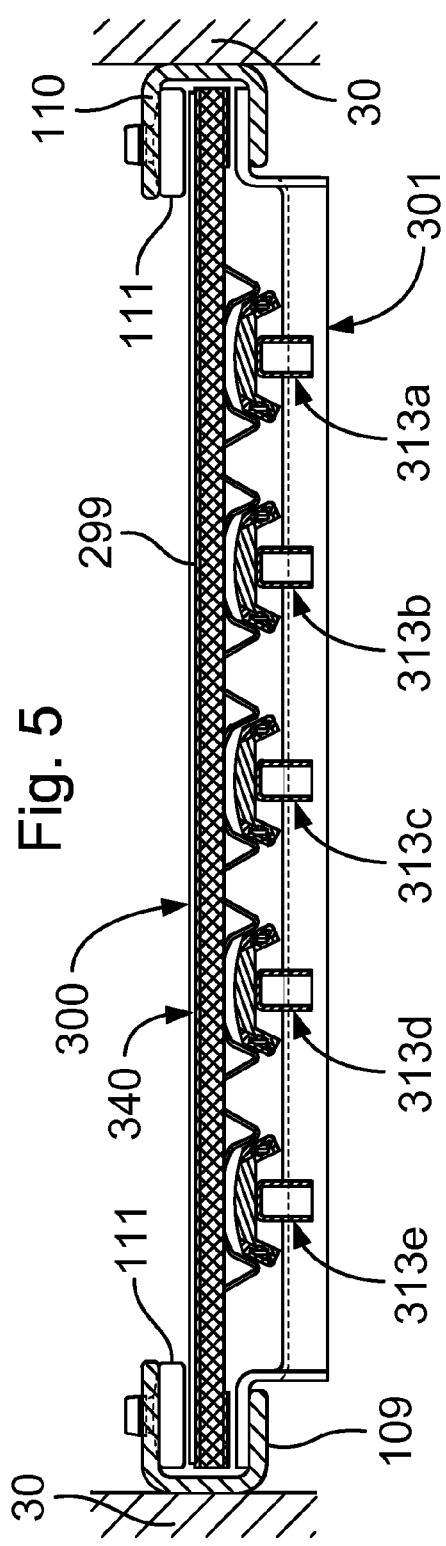
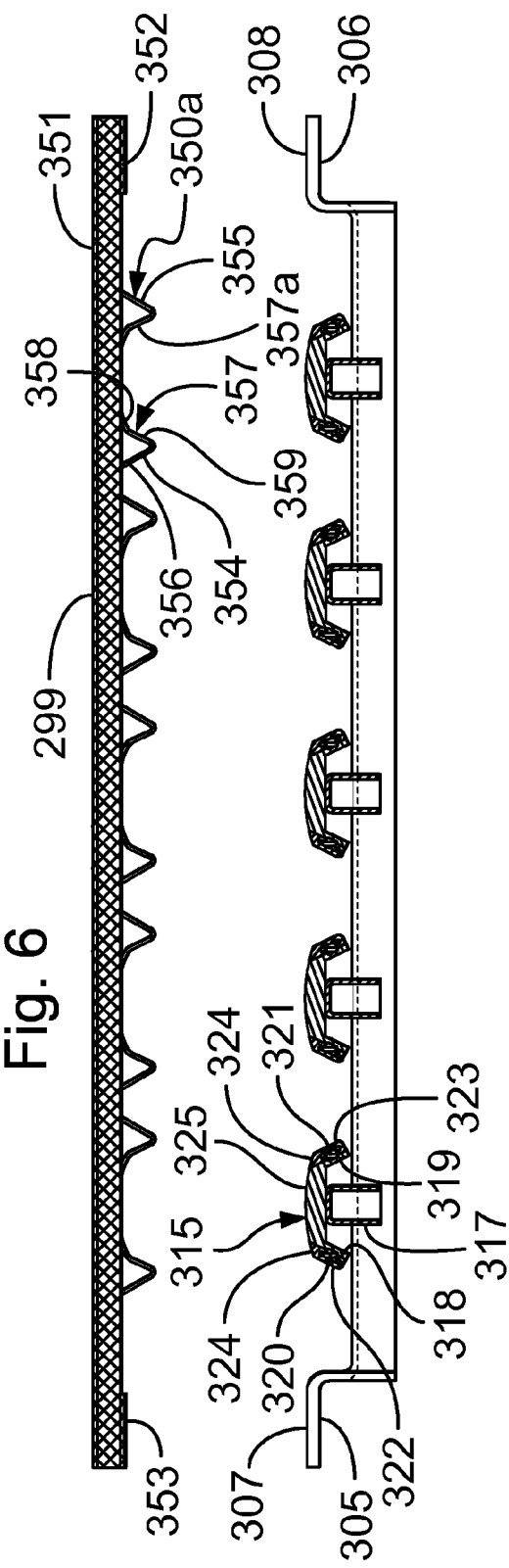

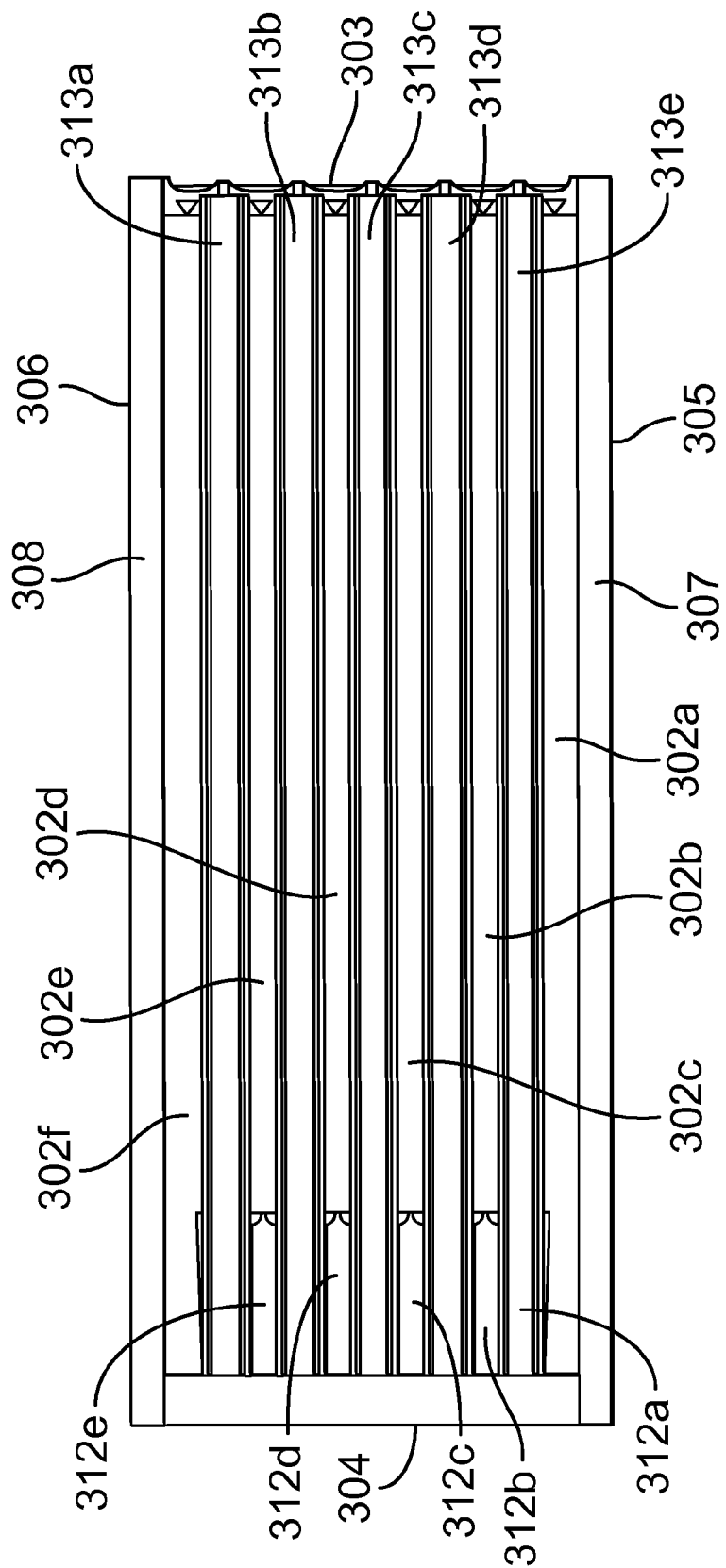

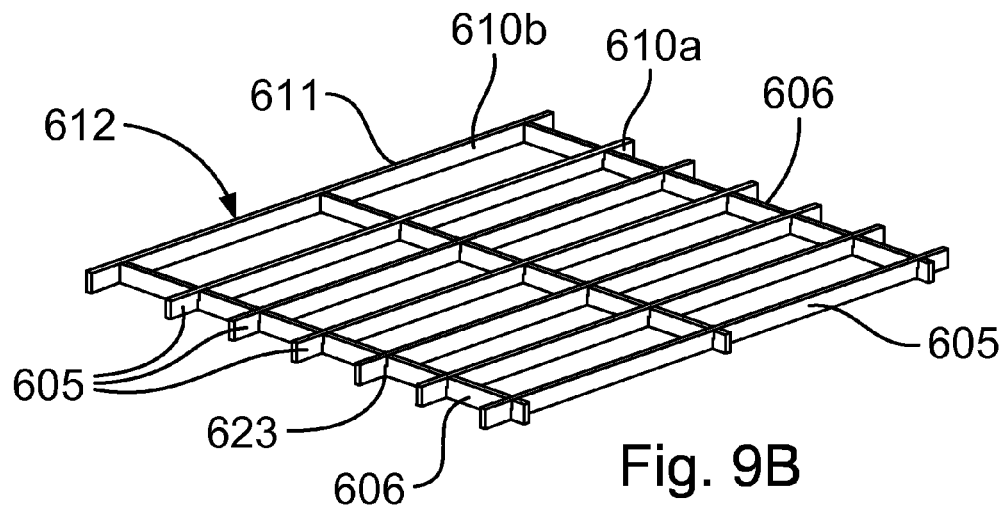
Fig. 9B
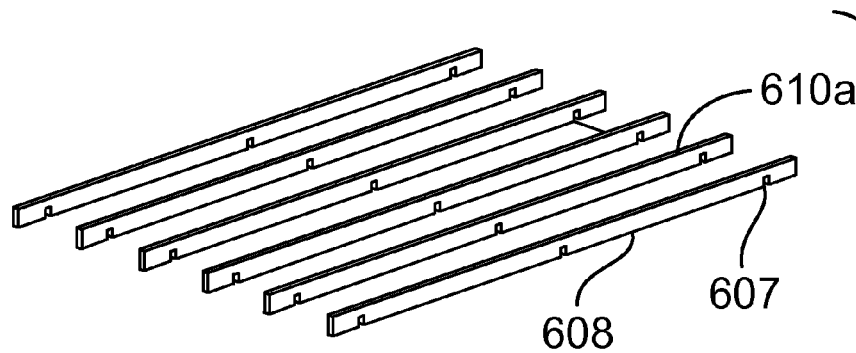
Fig. 9C
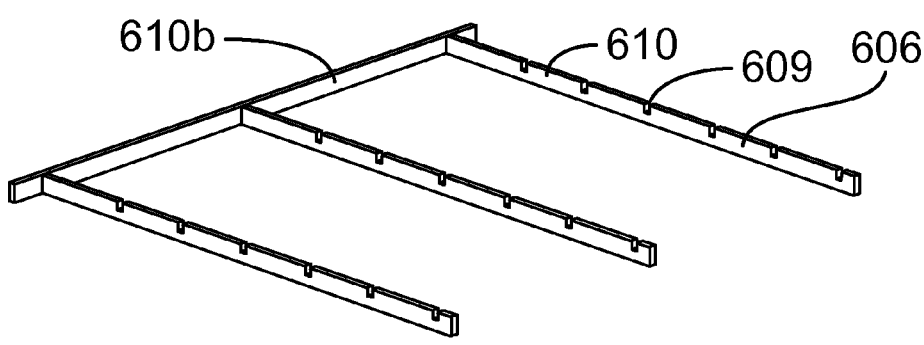

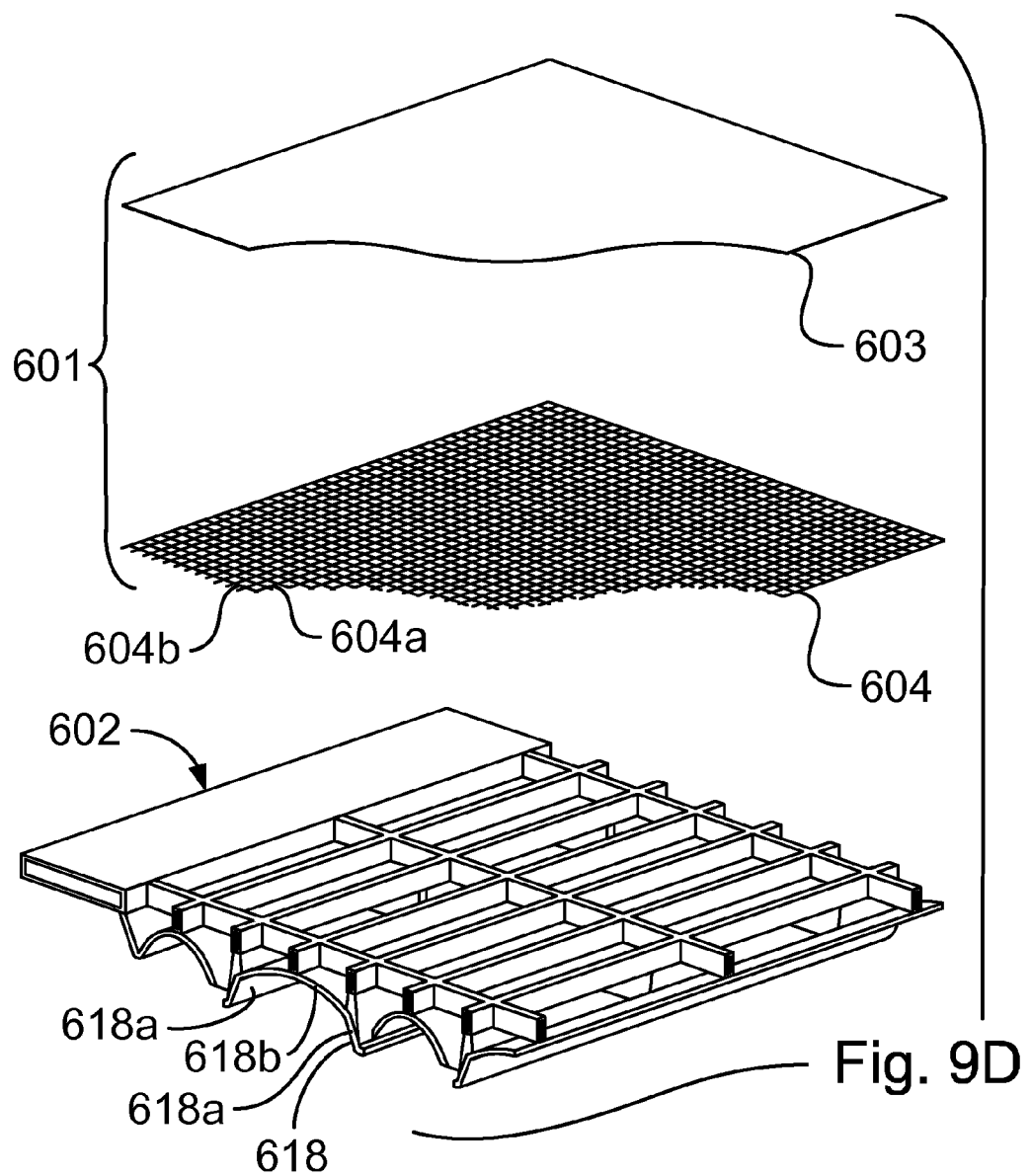

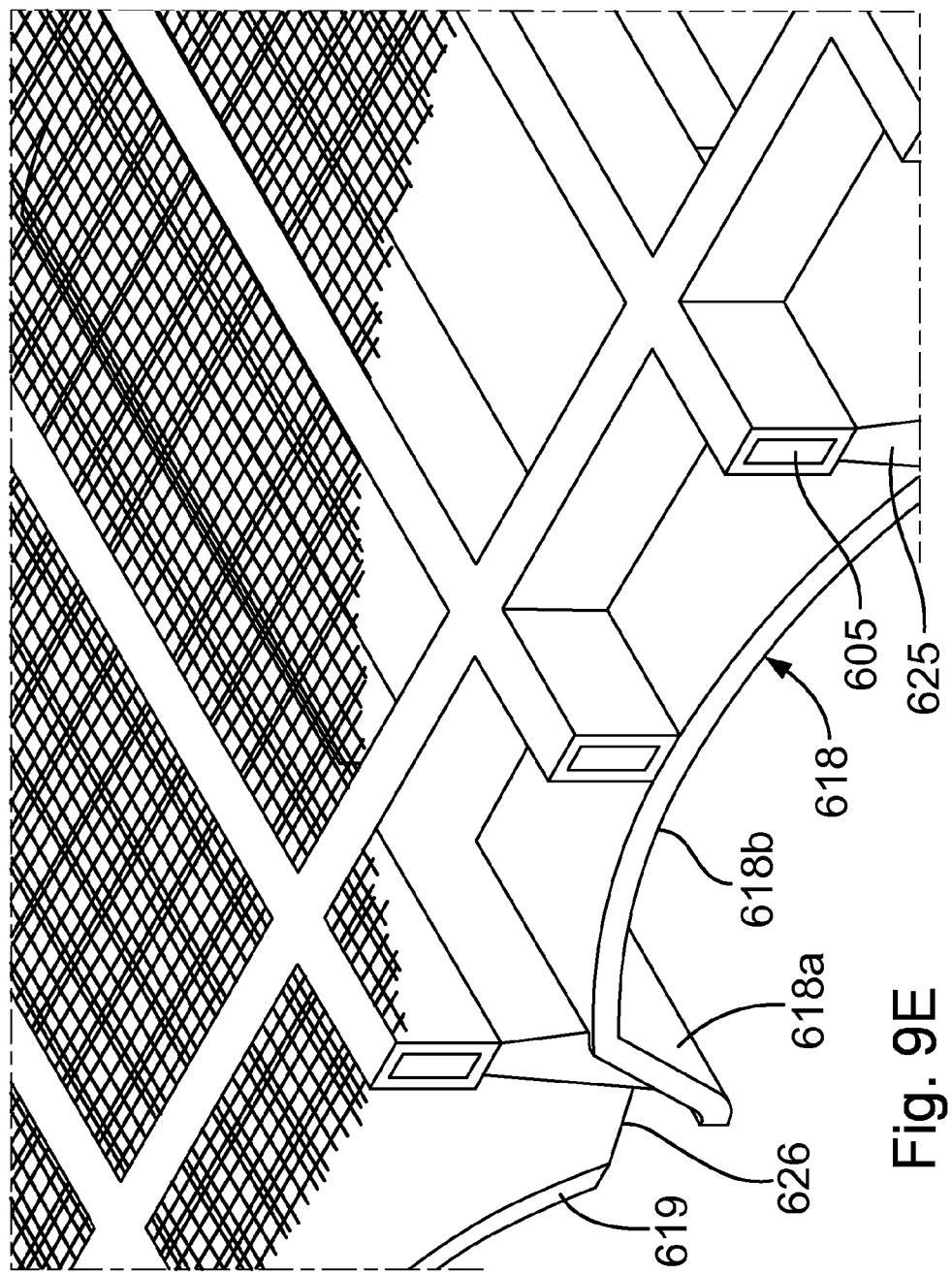

SCREEN ASSEMBLY AND A METHOD FOR MAKING SAME

BACKGROUND

The present invention relates to a screen assembly for a shale shaker or vibratory separator and a method for making a screen assembly.

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic oil-based lubricants and it is normal therefore to recover and re-use the used drilling mud, but this requires inter alia the solids to be removed from the drilling mud. This is achieved by processing the drilling mud. The first part of the process is to separate solids from the solids laden drilling mud. This is at least partly achieved with a vibratory separator, such as those shale shakers disclosed in U.S. Pat. No. 5,265,730, WO 96/33792 and WO 98/16328. Further processing equipment such as centrifuges and hydrocyclones may be used to further clean the mud of solids. The solids are covered in contaminates and residues. It is not uncommon to have 30 to 100 m$^3$ of drilling fluid in circulation in a borehole.

The resultant solids, known herein as "drill cuttings" are processed to remove substantially all of the residues and contaminates from the solids. The solids can then be disposed of in a landfill site or by dumping at sea in the environment from which the solids came. Alternatively, the solids may be used as a material in the construction industry or have other industrial uses.

SUMMARY

Shale shakers generally comprise an open bottomed basket having one open discharge end and a solid walled feed end. A number of rectangular screens are arranged over the open bottom of the basket. The screens may be substantially planar or have a slight crown. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces separation of the drilling mud from the solids, the drilling mud passing through the screens and the solids above the screens. The shaking motion also induces the solids to move along the screens towards the open discharge end. The recovered drilling mud is received in the receptor for further processing and the solids pass over the discharge end of the basket into the ditch or skip.

The rectangular screens may be arranged at an angle to horizontal, such as a seven degrees incline from the feed end to the discharge end of the shale shaker. The angle may be adjustable. The screens are generally fixed in the basket and the basket is adjustable to adjust the angle of the screens relative to horizontal. The flow of solids laden drilling fluid may form a pool on the inclined screens. The action of the vibratory mechanism induces solids to climb the inclined screens to the discharge end of the shaker and into the ditch or skip.

Generally, a vibratory mechanism inducing a circular vibration will tend to throw solids from the screen into the air in circular motions, which is often in shale shakers having a horizontal screen deck. A vibratory mechanism inducing an elliptical motion will induce the solids to move in a direction of the longest chord of the ellipse, which is often used in shale shakers having an inclined screen deck, such that in use movement of solids up the inclined screen deck is facilitated. A shale shaker having a vibratory mechanism inducing a very thin ellipse is known as a linear shale shaker and induces fast movement of solids along the screen, although the screen tends to suffer fast degradation due to sudden deceleration of the solids as they meet the screen.

The screens used in a shale shaker experience high acceleration values and heavy loading when processing drilling fluids. The high acceleration values are required in order to induce throughput through the screens and in order to convey the solids over the screen for discharge.

The shale shaker vibratory drive apparatus is sized in order to induce an optimal stroke profile based upon the total mass of assembly including the vibratory drive apparatus, basket, screens and solids laden drilling fluid therein i.e. all of the vibrated components, essentially the spring mass. The screens are clamped or otherwise fastened to the basket and the screens support the solids laden drilling fluid to be processed.

The motion induced into the assembly is typically a simple harmonic motion, whereby starting from its lowest point the vibratory drive, basket, screens and solids laden drilling fluids is accelerated upwards typically in an elliptical motion, the longest chord of the ellipse set at around forty-five degrees towards the front of the basket by high positive acceleration forces reducing towards mid stroke where the acceleration values reduce to zero then negative deceleration occurs reducing the velocity to a minimum at the top of the stroke. This cycle is repeated on the downward stroke showing that high acceleration values, (positive and negative) are experienced at each tip of the stroke where the velocity is minimized and the acceleration values are zero at each mid-point of the stroke where the velocities are at their highest.

As the fluids are not physically attached to the screens the screen loading varies therefore dependent upon the stroke cycle. During the upward stroke the screen is accelerated into the fluid mass thereby inducing throughput then the screen accelerates away from the fluid mass on the downward stroke only for the fluid mass to drop onto the screens again at the bottom of the stroke due to gravity and the whole cycle is then repeated typically at approximately 1800 to 2000 rpm.

For optimal performance the screen overall should preferably move as one entity matching the stroke profile of the basket and any deflection should be minimized. Should the screen deflect then this can lead to far higher acceleration values being induced leading to premature wear and uneven loading across the width of the screen. Given that the motion is also utilized to convey solids across the screen, any additional deflection of the screen will result in uneven conveyance across the screen width.

Prior art has shown that the screen can span the distance between the screen clamps on the sides of the basket that are utilized in order to clamp the screen to the basket, but this requires a significant amount of materials in order to provide the rigidity required. The downside of this approach is that the screens are generally bigger and heavier, so not so good for manhandling and may be more expensive to manufacture.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948 and an example of a shale shaker suitable for receiving the pre-tensioned type screens is disclosed in GB-A-2,176,424. GB-A-1,578,948 discloses a screen assembly comprising a rigid frame made from angle iron with a T-bar central support and a layer of tensioned supporting mesh and a fine screen mesh thereon tensioned to a lesser tension to create a whipping effect to help unplug plugged areas screen. U.S. Pat. No. 5,819,952 discloses a screen assembly having one layer of fine screen mesh made from stainless steel and a supporting layer of coarser mesh made from a softer material such as phosphor bronze wire or epoxy coated wire.

WO 2004/035234 discloses a screen assembly for a shale shaker, the screen assembly comprising a panel and a support structure, the panel has an area provided with a multiplicity of apertures and at least one layer of screening material arranged over the multiplicity of apertures. The apertures have downwardly projecting tabs to provide rigidity to the panel. Tabs of adjacent apertures form panel ribs. The support structure comprises a plurality of transverse support ribs. Transverse panel ribs fit over the transverse support ribs. The panel is removable from the support structure.

WO 03/013690 and WO 2004/069374 disclose a screen assembly comprising a screen element and a separate support. The screen element comprising a mesh panel and side inclined support members having a downwardly inclined face. The support comprises a rigid frame having side inclined surfaces at each side. When in use, the screen assembly is slid into rails of a shale shaker. A pneumatic seal arranged in the rails is activated to push the side inclined support members on to the inclined surfaces of the rigid frame to tension the mesh panel over the support. The screen element may comprise a light weight flexible apertured plate.

U.S. Pat. No. 6,305,549 discloses a screen assembly for use in a vibratory machine for separating solids and fluid. The screen assembly comprises a frame having tubular sides and intermediate rods of an aluminium or aluminium alloy and a layer of stainless steel screen material on the frame. It is noted that the difference in thermal expansion between the stainless steel screen material and the aluminium frame induces tensioning in the screening material in use.

A problem associated with shale shakers is that screens used therein tend to blind, especially when the solids are gummy, such as clay, or of a size close to the size of the mesh size of the screen. The latter type of blinding is known as near-sized particle blinding. A number of solutions have been proposed to tackle this problem, such as disclosed in GB-A-1,526,663 in which a screen assembly using two layers of screening material in a sandwich and allowing the layers of screening material to move independently to dislodge any near sized particles lodged in one of the screens. WO 01/76720 relating to the rotatable drum separator also discloses using air nozzles external to the perforate drum to provide positive pressure air through the perforate drum in the dry zone to ensure that the perforations do not clog with solids.

It is advantageous to use fine-meshed filters to filter very small particles, for example of a size in the range of 50-200µ or more, without the filtering device clogging up with the small particles. However, it is the fine-meshed filters in particular that are prone to such undesired clogging.

It is also advantageous to provide a separator which operates at low noise levels to comply with health and safety legislation. It is also advantageous to have a simple reliable separator to inhibit down-time for maintenance and repair.

It is preferable in certain circumstances to retain particles, for example of a particle size in the range of 50-60µ or larger, by means of a filter.

In the drilling of an oil or gas well, cracks may exist in the wall of the wellbore. Such cracks may propagate, which could cause structural problems in the wall of the wellbore and/or allow drilling fluids to escape therethorough into the formation. Furthermore, if substantial amounts of drilling fluids are lost, the pressure in the drilling fluid in the wellbore may drop, which could cause collapse of the wellbore. Accordingly, Wellbore Strengthening Materials may be added to circulated drilling fluid. The Wellbore Strengthening Materials comprise sized particles. When the drilling fluid is circulated around the wellbore wall with cracks therein, the sized particles wedge themselves in the cracks, which reduces the likelihood of the cracks propagating. It is beneficial to recover these sized particles and reuse them in circulated drilling mud. Shale shakers have thus been modified to size solids in solids laden drilling fluid. Such a shale shaker is disclosed in U.S. Ser. No. 12/490,492. A range of sizes of solids can be extracted using such a shale shaker and re-circulated as Wellbore Strengthening Material in fresh drilling fluid.

In order to expedite screening of solids laden drilling mud, energy is required to be imparted to the solids laden drilling at the juncture where the filtering takes place, i.e. where the solids laden drilling mud meets the screen.

Prior art also shows that the basket configuration may be such that additional support is offered to the screen between sides of the basket, GB-A-2,206,501 thereby reducing the span of the screen hence reducing the rigidity required of the screen such that the screen can be made smaller and lighter.

A shale shaker screen is subjected to high acceleration values and heavy solids loading whilst processing drilling fluids. The screen mesh requires adequate support and any deflection of the screen may compromise its performance.

The manufacturing techniques employed should be suitable for mass production and result in a strong and lightweight assembly.

In the drilling of an oil or gas well drilling mud may be returned to the surface at a high temperature, such as over one hundred and twenty degrees Celsius. This is particularly common in high temperature, high pressure wells (HTHP wells). The inventors have observed that longevity of the screen mesh often reduces when screen drilling mud which has come from such HTHP wells. The inventors have noted that screen tension alters when screening drilling mud which has come from such HTHP wells.

According to the present invention, there is provided a screen assembly comprising a support structure and at least one layer of screening material thereon, wherein the support structure comprises at least one structural member having a thermal expansion coefficient and the at least one layer of screening material has a thermal expansion coefficient characterised in that the thermal expansion coefficient of the structural members is substantially equal to the thermal expansion coefficient of the at least one layer of screening material thereon. Preferably, the support structure further comprises at least one brace for bracing the support members, said braces being of a material which has the same or a different thermal expansion coefficient or having parts with the same thermal expansion coefficient and other parts with a different thermal expansion coefficient.

Thus, the inventors have observed that by using materials having a similar observed that by using coefficient of thermal expansion, tension in the screening material remains taut and at the correct tension when in use separating hot solids from solids laden drilling mud. The hot solids laden drilling mud returned from a HTHP wellbore. The inventors have also noted that braces of a differing thermal expansion coefficient may be used. Preferably, the brace comprises a corrugated member, the corrugations may comprise planar tapered portions and may be curved and may have flat peaks and flat troughs. Advantageously, the peaks and troughs are arranged longitudinally with the screen assembly, such that screened material can flow therealong and advantageously have openings therein to allow screen fluid to flow therethrough. The peaks and troughs are arranged longitudinally with the screen assembly to allow a degree of relative movement between the structural members and the brace, such as with relative movement due to differences in thermal expansion coefficient. The interspaced openings along the length of the troughs also allow a degree of relative movement between the structural members and the brace, such as with relative movement due to differences in thermal expansion coefficient.

Preferably, the thermal expansion coefficient of all the structural members is substantially equal to the thermal expansion coefficient of the at least one layer of screening material thereon. Advantageously, the thermal expansion coefficient of preferably at least 75% and advantageously, between 50% the structural members is substantially equal to the thermal expansion coefficient of the at least one layer of screening material thereon.

Preferably, the at least one layer of screening material comprises stainless steel and advantageously, the structural members comprise stainless steel.

Advantageously, the structural members comprise bars. The bars may be of any cross-section, such as rectangular, square, oblong, circular, elliptical, other multi-sided shape such as T-section or L-section. The bars are preferably solid, but may be hollow or partly hollow. Preferably, the bars are arranged to form a lattice structure, such as a grid having rectangular openings.

Preferably, the bars in the lattice structure have top faces which lie in the same plane, such that screening material can be stretched thereon. Advantageously, the top faces of the bars lie in an arched plane, such that the at least one layer of screening material may be tensioned thereon to form a crown. Advantageously, the crown has a peak along a center line of the screen assembly and the crown has low points at each side of the screen assembly.

Preferably, the support structure is rectangular, square or oblong having a pair of sides and a pair of ends and further comprises a side member on each side of said pair of sides. Advantageously, the side members comprise box section members, preferably fixed to at least one support member. Advantageously, the box section members are made from a material having a thermal expansion coefficient substantially equal to the thermal expansion coefficient of the structural members and the thermal expansion coefficient of the at least one layer of screening material thereon.

Advantageously, the support structure further comprises bracing for bracing the structural members. Preferably, the bracing comprises a corrugated member. The corrugated member comprises corrugations having peaks and troughs. Advantageously, the corrugations are located between the structural members. Preferably, the corrugated member supports and are preferably fixed to the structural members at peaks of the corrugations and advantageously at the troughs of the corrugations. Advantageously, upstands are located between the troughs and the structural members. Preferably, the corrugated member has openings therein to allow fluid screened by the at least one layer of screening material to flow therethrough. Advantageously, the corrugations comprise at least one corrugation having tapered sides, such that, in use the tapered sides fit over a raised portion of a shale shaker or flow tray to preferably inhibit transverse or longitudinal movement of the screen assembly in the shale shaker. The inventors have noted that considerable longitudinal forces are induced in the screen assembly by the vibratory mechanism. The tapered portions preferably fit over corresponding tapered portions, thus providing a large contact area. The large contact area provides a high degree of surface tension and thus inhibits movement of the screen assembly relative to the screen deck and hence the basket, whilst still allowing easy insertion of the screen assemblies when replacing the screen assemblies. Preferably, there are a plurality of corrugations with at least one and preferably two tapered portions. Preferably, the two tapered portions slope downwardly and away from each other. Advantageously, the corrugations may have flat or arched top portions. Preferably, the corrugated member is formed of a plastics material and is moulded on to the support members. Advantageously, the corrugated member comprises metal portions over which the plastics material is moulded to form a composite corrugated member, such that part of the structural strength of the corrugated member comes from the plastics material and part from the metal portions. Preferably, at least part of the structural support is coated in plastics material, advantageously, the structural members and side members are coated in plastics material. Advantageously, the bracing comprises straight portions at an angle to the support members and arranged therebetween or thereunder.

Preferably, the screen assembly further comprises a second layer of screening material. Advantageously, the screen assembly further comprises a coarse layer of mesh to support the at least one layer of screening material. Preferably, an aperture plate is arranged between the at least one layer of screening material and the support structure. Advantageously, the aperture plate is made from a material having a thermal expansion coefficient substantially equal to the thermal expansion coefficient of the structural members and the thermal expansion coefficient of the at least one layer of screening material thereon. The layer of screening material and/or coarse layer of mesh may be fixed to the support structure by laser welding, ultrasonic welding, vibration/friction welding or other joining technique and may be fixed in one action or the coarse layer fixed first and then the screening material afterwards.

Preferably, the at least one raised portion comprises at least one wear strip. Advantageously, the flow tray is made from a composite material. Advantageously, the at least one raised portion defines flow channels for directing the screened drilling fluid along the flow tray. Preferably, the raised portion forms a longitudinal wall spanning at least a major portion and advantageously the entire length of the flow tray. Preferably, the flow tray is substantially the same length as the screen deck on which the screen assembly or screen assemblies lie in use. Alternatively, the flow tray has a length which is a major portion of the length of the screen deck. Preferably, the flow channels are tapered to facilitate flow of screened drilling mud. Preferably, tapered in depth, the flow channels have a high underside at a first end and a low height at the second end at which the screened drilling fluid is discharged.

Advantageously, the shale shaker comprises a basket, the flow tray fixed to the basket. Preferably, the basket comprises sides, the flow tray fixed to the sides. Advantageously, the sides each have a rail, the flow tray supported on the rail. Preferably, the flow tray is adhered, riveted, screwed, glued, welded or otherwise fixed to the rail and/or sides. Alternatively, the flow tray is removable from the basket, preferably slidably removable.

Preferably, the flow tray comprises a plurality of contours, at least one of the contours forms the at least one of the raised portions.

Advantageously, the at least one raised portion is a plurality of raised portions. The more raised portions, the better the support for the screen assembly, although the flow channels need to be sized to remove the throughput of screened drilling mud, which can be in the order of a thousand gallons per minute.

Preferably, the screen support comprises a tapered surface. Advantageously, the at least one raised portion comprises a tapered support surface to receive the tapered surface of the screen support. Preferably, the tapered surface is formed from a sheet material, which may be sheet metal folded to form a tapered surface. Preferably, the sheet material has openings therein to allow screened drilling mud to flow through the screening material.

The present invention also provides a method for making a screen assembly, the method comprising the steps of constructing a plurality of support members to form a grid and placing the grid in a mould whereupon a flowable plastics material is injected into the mould, whereupon the flowable plastics material is hardened. Preferably, the hardened plastics material forms braces for said support members in said grid. Advantageously, the plastics material coats the support members.

Advantageously, the support members are metal bars. Preferably, the metal bars are made from stainless steel. Preferably, the method further comprises the step of notching the bars and fitting the bars together using the notches. Advantageously, the bars are welded at their intersections. Alternatively, the grid may be cast, preferably from a stainless steel. Preferably, the method further comprises the step of removing the support structure from the mould and/or the mould removed therefrom.

Preferably, the thickness of the plastics material surrounding the support members is less than 1000 micrometers. Advantageously, the plastics material forming braces for the support members has a thickness of approximately 2000 micrometers.

Advantageously, at least one layer of screening material, such as wire mesh, is tensioned in a jig. Advantageously, the jig comprises pneumatic and/or hydraulic cylinders in both longitudinal and transverse axes, to tension the mesh to a predetermined tension for the particular gauge/material of the at least one layer of screening material. Preferably, the at least one layer of screening material is fixed to the support members before plastics material is injected into said mould. Advantageously, the at least one layer of screening material is fixed to the support members after plastics material is injected into said mould. Preferably, the at least one layer of screening material is fixed to the support members before being placed into said mould.

The above method and screen assembly enables the same materials to be used for load bearing purposes and therefore avoids any potential coefficient of thermal expansion issues.

A potentially cheaper alternative technique may be utilized where high working temperatures are not an issue whereby the load bearing structure is completely encapsulated within the carrying frame engineering plastic and the mesh is then joined predominantly to the engineering plastic typically by laser welding, ultrasonic welding, vibration/friction welding or any other joining technique.

UK Patent Application No. 10 071 65.2 (unpublished at the time of filing of the present application) discloses a screen assembly arrangement in a shale shaker offering increased support to the screens by minimizing the span between supports and the use of tapered surfaces encourages the screen to wedge itself into the support structure. This in conjunction with the increased contact area between the screen and the support arrangement dictate that the friction forces to be overcome when lifting the screen from the support arrangement are higher than that required for a simple point contact arrangement.

The inventors noted that for the simple point contact arrangement the reaction forces acting on the screen and support structure are vertical only such that support is given during the upward stroke of the basket only.

The tapered surfaces proposed dictate that the reaction forces are angled perpendicular to the angled faces and that equivalent loads can be calculated comprising of a vertical component and a horizontal component. The horizontal component reacts against the screen and is an additional force to be overcome as the screen deflects under its own weight during the downward stroke of the basket. Maximising this force therefore will help minimizing screen deflection during the downward stroke.

UK Patent Application No. 10 071 65.2 (unpublished at the time of filing of the present application) discloses an apparatus for separating solids from solids laden drilling fluid, the apparatus comprising a shale shaker and a screen assembly, the shale shaker comprising a flow tray for directing screened drilling fluid, the screen assembly comprising at least one layer of screening material, a support and a perimeter with at least one support point within the perimeter, characterised in that the flow tray comprises at least one raised portion to support the screen assembly. Thus the flow tray is preferably used as a structural component to increase the rigidity of the screen assembly. Also disclosed is a an apparatus for separating solids from solids laden drilling fluid, the apparatus comprising a shale shaker and a screen assembly, the shale shaker comprising a basket having side supports and at least one intermediate support arranged between the side supports, the screen assembly comprising a screen support supporting at least one layer of screening material, the screen support having at least two sides to be supported by the side supports and at least one support member between the sides for engaging with the at least one intermediate support, characterised in that the screen support comprises a tapered surface and the at least one intermediate support has a tapered support surface, such that, in use, the tapered surface and the tapered support surface abut. Preferably, this arrangement inhibits lateral and tangential movement of said screen assembly in said basket.

BRIEF DESCRIPTION OF THE DRAWINGS

For a better understanding of the present invention, reference will now be made, by way of example, to the accompanying drawings, in which:

FIG. 2A is a side cross-sectional schematic view of an apparatus for separating and sizing solids from solids laden drilling mud, the apparatus comprising a base and a basket floating thereon;

FIG. 3 is a schematic end view, partly in section of a screen deck, a flow tray and a screen assembly;

FIG. 4 is a schematic end view, partly in section of a screen deck, a flow tray and a screen assembly;

FIG. 5 is a schematic end view, partly in section of a screen deck, a flow tray and a screen assembly; and FIG. 6 is a schematic end view, partly in section of the flow tray shown in FIG. 5 spaced from the screen assembly shown in FIG. 5;

FIG. 6A is a top plan view of the flow tray shown in FIG. 5;

FIG. 9B shows a part of the support structure of the screen assembly shown in FIG. 9A;

FIG. 9C shows an exploded view of the part of the support structure shown in FIG. 9B;

FIG. 9D is a perspective exploded scrap sectional view of the screen assembly shown in FIG. 9A;

FIG. 9E shows a perspective scrap sectional enlarged view of the support structure shown in FIG. 9A;

DETAILED DESCRIPTION

Figure 1:
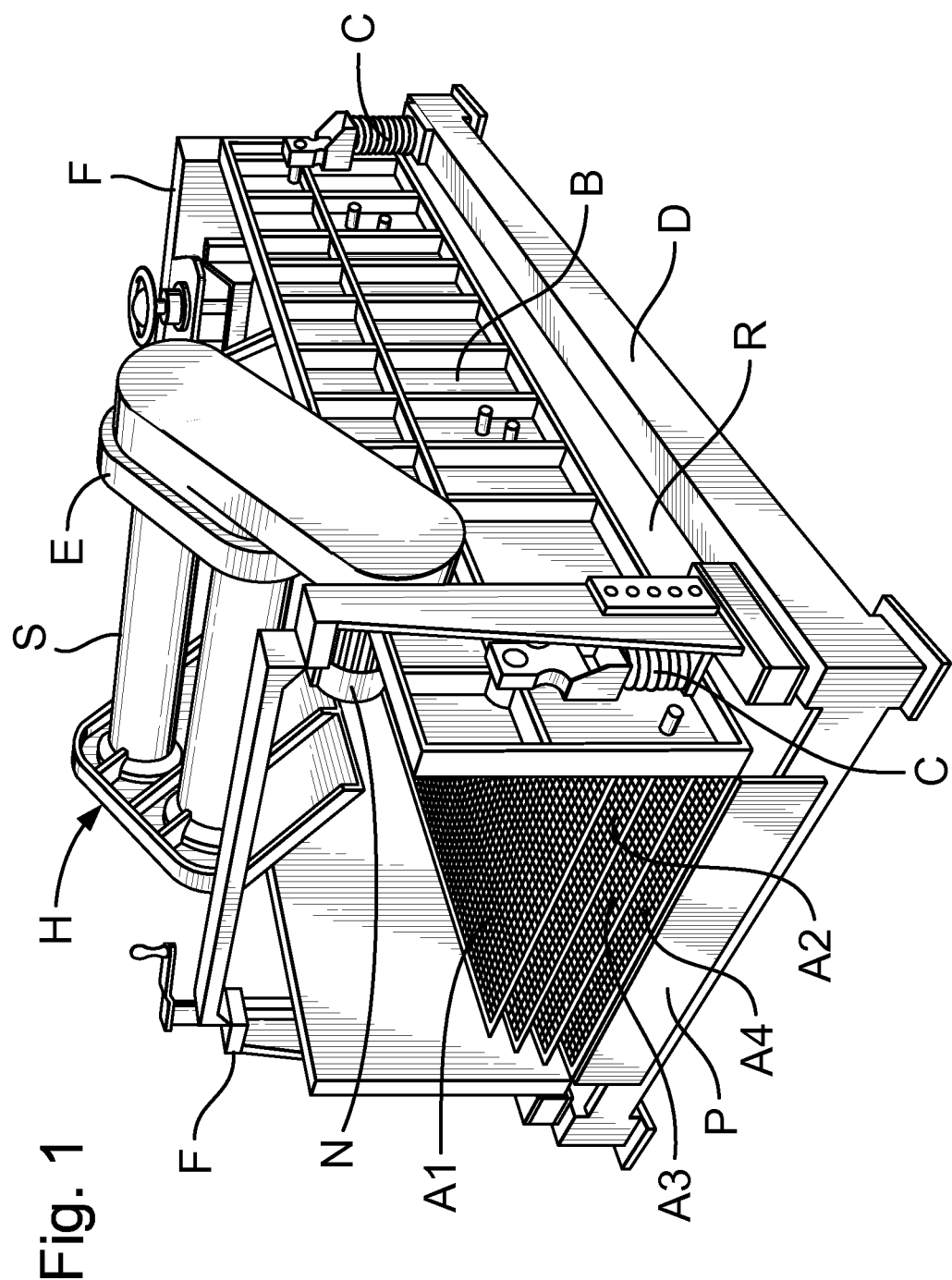
FIG. 1 shows a perspective view of an apparatus for separating solids from solids laden drilling mud.

FIG. 1 shows an apparatus for separating solids from a solids laden drilling mud, generally referred to as a shale shaker and identified herein by reference H. The shale shaker H comprises a base D having an open bottom R arranged above a collection receptacle (not shown) for receiving screen drilling mud. A basket B is arranged on springs C on the base D. A vibratory apparatus E is arranged on top of the basket B. The vibratory apparatus E comprises an electric or hydraulic motor N rotating offset clump weights hidden within casing S, which induce a motion in the basket D. An upper, upper middle, lower middle and lower screen assemblies AI, A2, A3, A4 are arranged in the basket D and fixed thereto in rails (not shown) so that the motion induced in the basket is transferred to the screen assemblies AI, A2, A3, A4. Solids laden drilling fluid is fed on to the screen assemblies A1-A4 from a feed chamber F at a feed end of the apparatus. The motion induced in the screen assemblies A1-A4 facilitates separation of solids from drilling mud. Screened drilling mud passes through the screen assemblies into the collection receptacle (not shown) and solids climb along the screen assemblies A1-A4 to a discharge end P of the shale shaker and into a skip, ditch or other cuttings transfer apparatus (not shown).

Figure 2B:
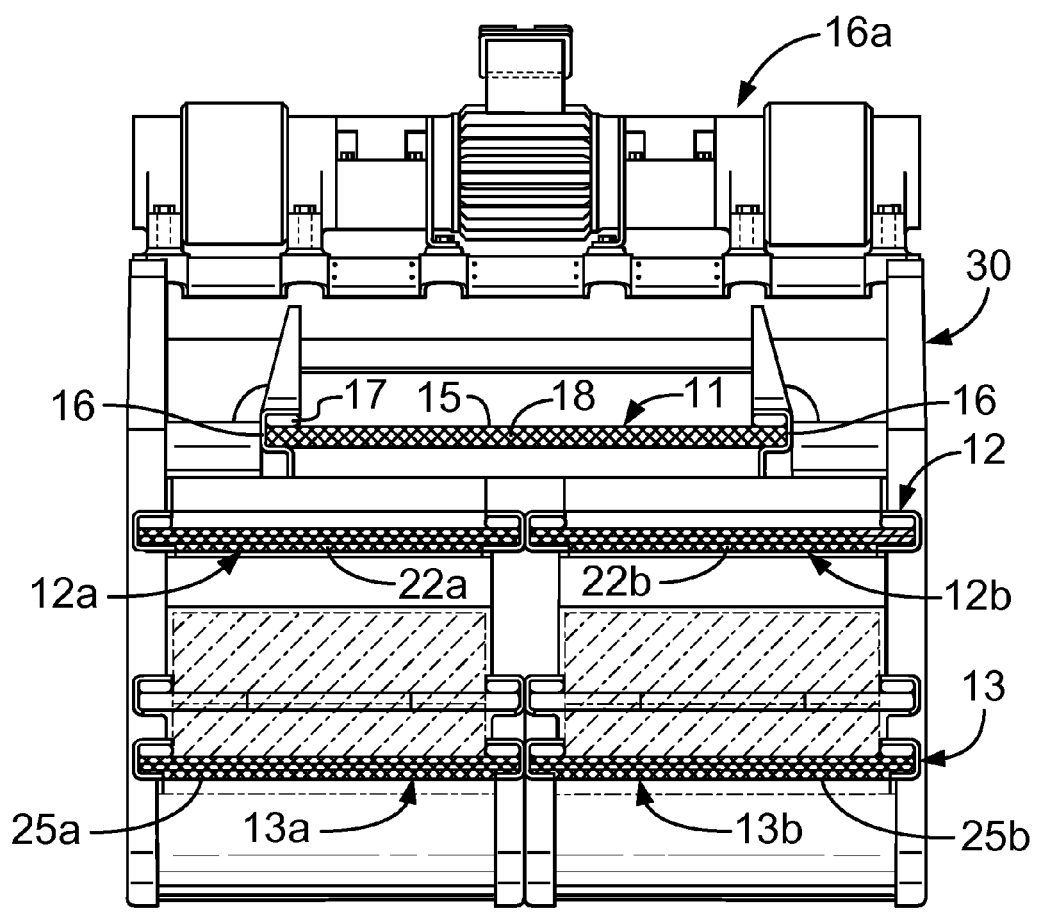
FIG. 2B is an end view of the basket shown in FIG. 2A showing screen decks and screen assemblies therein.

FIGS. 2A and 2B show a shale shaker 10 having a base 20 and a basket 30 arranged thereon on springs (not shown). The basket 30 comprising a scalping deck 11, an upper primary deck 12 and a lower primary deck 13. The upper primary deck 12 has a left-hand side 12a and a right-hand side 12b. The lower primary deck has a left-hand side 13a and a right-hand side 13b. Solids laden drilling fluid is introduced to a feed end of the shale shaker 14 from a feeder (not shown) on to a scalping screen 15 arranged in C-shaped channels 16 of the scalping deck 11. An expandable pneumatic bladder 17 is arranged in a top part of the C-shaped channels 16 to clamp the scalping screen 15 therein. Alternatively, a wedge may be used to secure the scalping screen 15 in the C-shaped channels 16. The scalping screen 15 comprises a screen 18 having relatively large openings for inhibiting large particles from passing though on to the primary decks, but allowing some solids and drilling mud therethrough. The scalping deck 11 and the screen 15 thereon is arranged at an uphill tilt of approximately two degrees from horizontal, although the scalping screen 15 and scalping deck 11 may be arranged horizontally, slightly downhill or at a slightly greater uphill angle. Vibratory apparatus 16a fixed to the basket 30 induces motion therein. The motion facilitates separation of large solids from the solids laden drilling mud and induces movement in the large solids along the scalping screen 15 from the feed end 14 to the discharge end 19 of the shale shaker. The large solids may be caught in a ditch or on a conveying means and further processed or used in other operations. The solids laden drilling fluid which passes through the scalping screen 15 falls on to a flow tray 21 which directs the solids laden drilling fluid to the feed end 14 of screen assemblies 22a and 22b in the upper primary deck 12. A weir 23 is arranged at the feed end of the primary deck 12 to retain the solids laden drilling fluid. If the level of the solids laden drilling fluid rises beyond the height of the weir 23, solids laden drilling fluid passes thereover into a duct 24 and on to screen assemblies 25a and 25b in the lower primary screen deck 13. The screen assemblies 22a, 22b and 25a and 25b are preferably of the same type and have the same screen mesh thereon.

A gate valve 26 in the form of a slidable tray, is in a closed position, closing off a duct 29, to run the shale shaker in a parallel mode. Screened drilling mud falls through the screen assemblies 22a and 22b in the upper screen deck on to a flow tray 27 and over the closed gate valve 26 and into a duct 28 which runs parallel to the duct 24. However, duct 28 leads to the bottom of the basket and directly into the collection receptacle (not shown) therebelow. Solids falloff the discharge end 31 of upper screen deck 12 and discharge end 32 of the lower screen deck 13 and into a skip or other conveying apparatus for conveying the solids for further processing or re-use.

The gate valve 26 may be retracted to allow drilling mud screened by the screen assemblies 22a and 22b in the upper screen deck 12 to be further screened by screen assemblies 25a and 25b on the lower screen deck 13. The shale shaker thus runs in a series mode. In this situation, it is preferable to use a finer screen mesh in the screen assemblies 25a and 25b than the screen mesh used in screen assemblies 22a and 22b. Drilling mud screened by the screen assemblies 22a and 22b in the upper screen deck 12 flows in the flow tray 27 and into a duct 29, which directs the screened drilling mud on to the feed end of the screen assemblies 25a and 25b in the lower screen deck 13. Sized solids fall off the discharge end 31 of upper screen deck 12 into a conveyor (not shown) to be conveyed and mixed into a fresh batch of drilling mud for re-circulation. These sized solids are used to block cracks in the formation as hereinbefore described. Solids discharges from the discharge end 32 of the lower screen deck 13 are conveyed in a separate conveyor or added to a skip for further processing or used for other purposes.

Figure 3A:
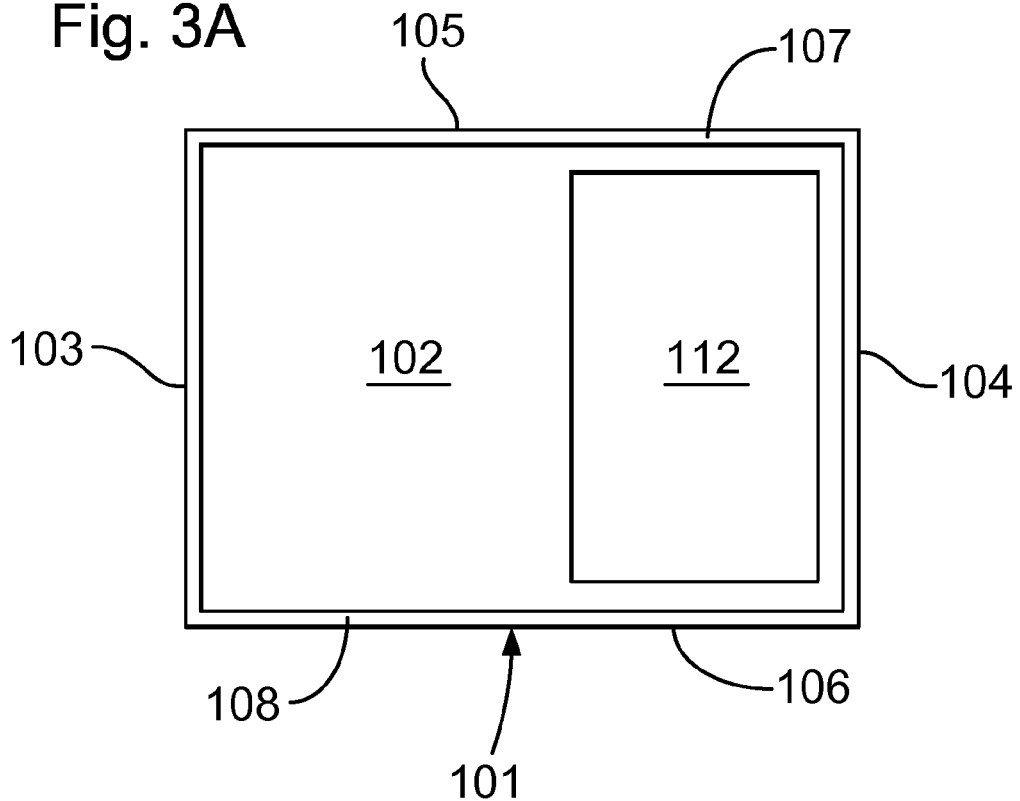
FIG. 3A is a top plan view of the flow tray shown in FIG. 3.

Referring to FIGS. 3 and 3A, there is shown a screen assembly 100 and a flow tray 101. The flow tray 101 comprises a recessed zone 102, a closed end 103, an open end 104 and a pair of sides 105 and 106. The sides 105 and 106 comprise flanged portions 107 and 108, which flanged portions 107 and 108 are slid into C-shaped channels 109 and 110 in basket 30 and fixed therein. Preferably, the flanged portions 107 and 108 are glued or otherwise adhered to the C-shaped channels 109 and 110, but may be slideably removable from the channels and fixed with the screen assembly 100 by expandable pneumatic hose seal 111. The recessed zone 102 may have a substantially horizontal planar base, which when fixed in said C-shaped channels 109 and 110, assumes a slope equal to the slope of the screen assembly 100, which is preferably seven degrees. The tray also has an opening 112 therein. The gate valve 26 of the shale shaker 10 selectively prevents and allows screened drilling mud through the opening 112.

Figure 4A:
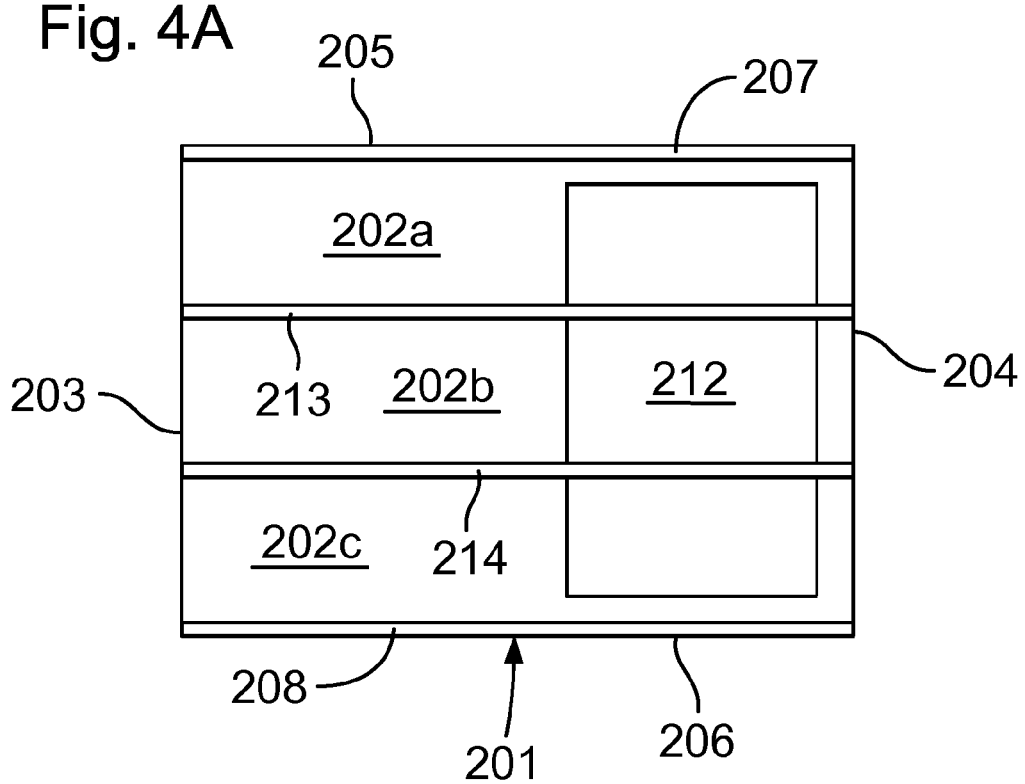
FIG. 4A is a top plan view of the flow tray shown in FIG. 4.

FIG. 4 shows a screen assembly 200 and a flow tray 201. The flow tray 201 comprises three recessed zones 202a, 202b and 202c, a closed end 203, an open end 204 and a pair of sides 205 and 206. The sides 205 and 206 comprise flanged portions 207 and 208, which flanged portions 207 and 208 are slid into C-shaped channels 109 and 110 in basket 30 and fixed therein. Preferably, the flanged portions 207 and 208 are glued or otherwise adhered to the C-shaped channels 109 and 110, but may be slidably removable from the channels and fixed with the screen assembly 200 by expandable pneumatic hose seal 111. The recessed zones 202a, 202b and 202c may have a substantially horizontal planar base, which when fixed in said C-shaped channels 109 and 110, assumes a slope equal to the slope of the screen assembly 200, which is preferably seven degrees. The tray also has an opening 212 therein. The gate valve 26 of the shale shaker 10 selectively prevents and allows screened drilling mud through the opening 212. A pair of intermediate supports 213 and 214 bind the recessed zones 202a, 202b and 202c. The supports 213 and 214 comprise upstands 215 and 216 spanning the length of the flow tray 201. The upstands each have a T-connector 217 and 218 fixed thereto or integral therewith, with a wear strip arranged thereon. The wear strip may be any hard wearing material such as HDPE. A top of the wear strips 219 and 220 lie slightly above the top of the flanged portion 207 and 208 of the flow tray, preferably by 2 or 3 mm at the center. The screen assembly 200 sits on top of the wear strips 219 and 220 and is held thereon by inflation of the inflatable pneumatic hose 111 in the C-shaped channels 109 and 110. Structural rigidity of said flow tray is thus used in supporting the screen assembly 200.

Figure 6B:
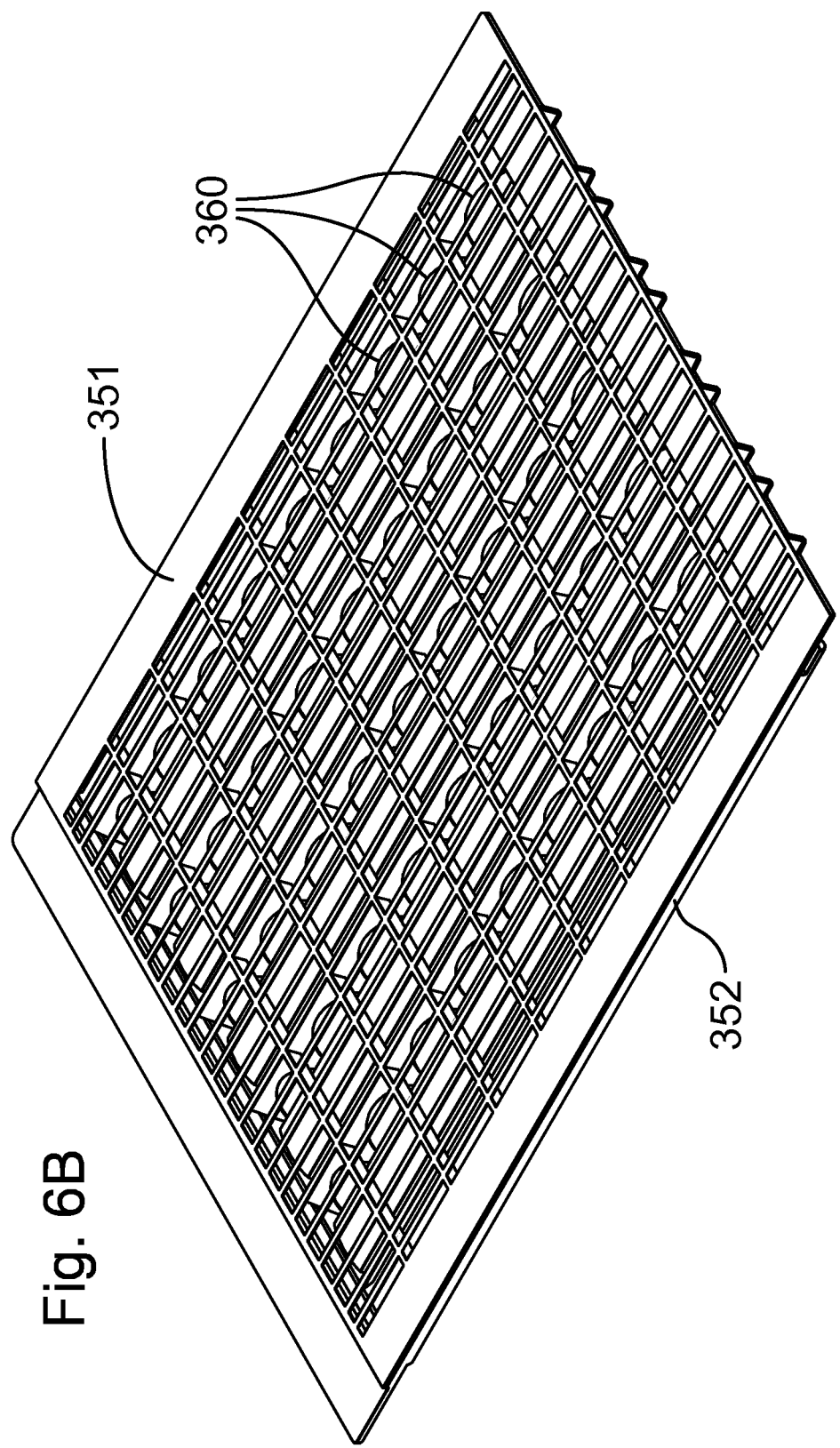
FIG. 6B is a perspective view of the screen assembly shown in FIG. 5.

FIGS. 5 to 6B show a screen assembly 300 and a flow tray 301. The flow tray 301 comprises six recessed zones 302a, 302b 302c, 302d, 302e and 302f, a closed end 303, an open end 304 and a pair of sides 305 and 306. The sides 305 and 306 comprise flanged portions 307 and 308, which flanged portions 307 and 308 are slid into C-shaped channels 109 and 110 in basket 30 and fixed therein. Preferably, the flanged portions 307 and 308 are glued or otherwise adhered to the C-shaped channels 109 and 110, but may be slidably removable from the channels and fixed with the screen assembly 300 by expandable pneumatic hose seal 111. The recessed zones 302a to 302f may have a substantially horizontal planar base, which when fixed in said C-shaped channels 109 and 110, assumes a slope from the discharge end 31 to the feed end 14 of the shale shaker equal to the slope of the screen assembly 200, which is preferably seven degrees. The tray also has opening 312a, 312b, 312c and 312d therein. The gate valve 26 of the shale shaker 10 selectively prevents and allows screened drilling mud through the opening 312a to 312d. Five intermediate supports 313a, 313b, 313c, 313d and 313e bind the recessed zones 302a to 302e. Only support 313e will be described in detail herein, although it should be noted that all the structural support members 313a to 313e are as described for structural support member 313e. The support 313 comprises an upstand 317 spanning the length of the flow tray 301. The upstand 317 has a strip 315 fixed or integral with the upstand 317. The strip 315 has two sides each having a tapered portion 318 and 319. The taper of each tapered portion 318, 319 is preferably at an acute angle from the plane of the flow tray 301, preferably between ten and eighty degrees, advantageously, forty-five to seventy degrees and most preferably sixty to seventy degrees from a horizontal plane. Each tapered portion 318 and 319 has therealong a T-shaped member 320 and 321 fixed thereto or integral therewith, with a wear strip 322 and 323 arranged thereon. The tapered portions 318 and 319 each taper at a converging angle from the flow tray 301. The wear strips 322 and 323 may be made from a hard wearing material such as HDPE. A top 325 of the strip 315 lies slightly above the top of the flanged portion 307 and 308 of the flow tray, preferably by 2 or 3 mm at the centre center support 313c, 1 to 2 mm on the adjacent supports 313b and 313d and 0.5 to 1 mm on the outer supports 313a and 313e. The wear strips 322 and 323 have a chamfered portion 324, and the top 325 of the strip 315 has a slight crown. The chamfered portions 324 provide a smooth transition between the top 325 and the wear strips 322 and 323.

The screen assembly 300 comprises a screen support 340 comprising a perforate plate 351, such as a perforate plate of metal or perforate plastics or perforate composite material. The perforations in the perforate plate 351 may be rectangular, as shown and which is preferred or any other suitable shape, such as octagonal, hexagonal, triangular, square, round. At least one layer of screening material 299 is adhered or otherwise attached to a top surface of the perforate plate 351. The at least one layer of screening material 299 may be two layers of screening material of equal mesh size and may be supported on a supporting layer of screening material having a larger mesh size and large gauge wires.

The screen support 340 comprises outer tubular frame members 352 and 353 along each side of the screen support. Each tubular frame member 352 and 353 is of hollow rectangular cross-section. Structural support members 350a to 350e are welded or otherwise attached or integral with the perforate plate 351. Only structural support member 350a will be described in detail herein, although it should be noted that all the structural support members 350a to 350e are as described for structural support member 350a. Structural support member 350a is symmetrical having a first side 354 and a second side 355 which are minor images of each other. The first side 354 has an outer tapered portion 356 arranged in a plane at approximately sixty degrees from horizontal. A top edge of the outer tapered portion 356 is welded or otherwise attached to the perforate plate 351. An inner tapered portion 357 is linked to the other side 355 with a curved portion 358. The inner tapered portion 357 of side 354 and the inner tapered portion 357a of side 355 diverge from the perforate plate 351. The curved portion 358 is shaped such that, in use, it sits over the crowned top 325 and chamfered portions 324 of the wear strips 322 of each support 313a to 313e of the flow tray 301. The curved portion 358 is not fixed to the perforate plate 351 and stands clear with a gap therebetween. The lower part 359 lies in a plane of approximately sixty-five degrees from horizontal to conform to an outer face of the wear strip 324 on the tapered portion 318 of each support 313a to 313e. The structural support members 350a to 350e further comprise a curved portion 358 linking the two sides 354 and 355. The structural support members 350a to 350e have a plurality of openings 360 therein to allow fluid to flow therethrough on to the flow tray 301. The structural support members 350a to 350e may be made from sheet metal such as galvanised steel and may be formed by folding the sheet metal. The openings 360 may be punched or laser cut in the sheet metal prior to folding. Alternatively, the structural support members 350a to 350e may be formed from a composite material such as a fiber reinforced material such as KEVLAR™.

In use, the screen assembly 300 is inserted into the C-shaped channels 109 and 110 above the flow tray 301. The inner tapered portions 357 of the structural support members 350a to 350e slide along their respective wear strips 322a and 323a during insertion and then sit thereon. The screen assembly 300 is clamped in place by inflation of the inflatable pneumatic hose 111 in the C-shaped channels 109 and 110. Inflation of the pneumatic hose 111 pushes the sides of the screen assembly 300 on to the flanged portions 307 and 308 of the flow tray 301 and the inner tapered portions 357 of 20 the structural support members 350a to 350e slide down their respective wear strips 322 and 323 to 323e to achieve a tight fit. Gaps between the top 325a to 325e and the screen support are likely due to tolerances in the relative size and location of the structural support members 350a and the supports 313a to 313e of the flow tray 301. However, the abutment of the inner tapered portions 357 of the structural support members 350a and their respective wear strips 322 and 323 provide a large contact area for supporting the screen assembly 300. Furthermore, the screen assembly 300 is inhibited from lateral movement in the basket 30 of the shale shaker.

Figure 7:
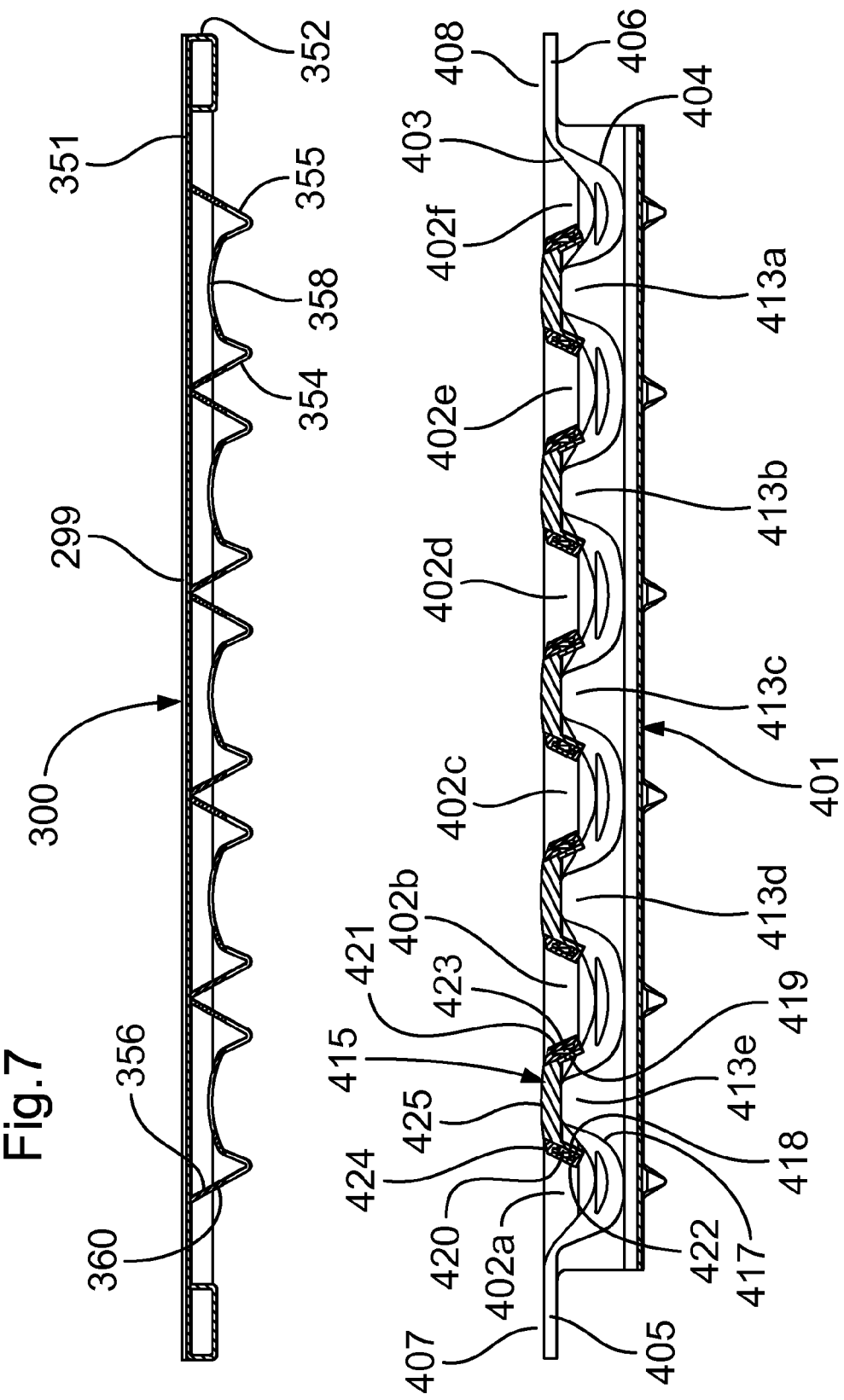
FIG. 7 is a schematic end view in cross section of the screen assembly shown in FIG. 5, spaced from a flow tray.

FIG. 7 shows the screen assembly 300 shown in FIGS. 5 to 6B with a flow tray 401. The flow tray 401 comprises a comprises six recessed zones 402a, 402b 402c, 402d, 402e and 402f to facilitate flow of drilling fluid therealong, a far end 403, an open end 404 and a pair of sides 405 and 406. The sides 405 and 406 comprise flanged portions 407 and 408, which flanged portions 407 and 408 are slid into C-shaped channels 109 and 110 in basket 30 and fixed therein. Preferably, the flanged portions 307 and 308 are glued or otherwise adhered to the C-shaped channels 109 and 110 and may by riveted or mechanically fixed, but may be slidably removable from the channels and fixed with the screen assembly 300 by expandable pneumatic hose seal 111. The recessed zones 402a to 402f have an undulating profile which taper in depth from the far end 403 to the open end 404, which assumes a slope from the discharge end 31 to the feed end 14 of the shale shaker greater than the slope of the screen assembly 300. The slope of the screen assembly may be adjustable between ten degrees uphill and one degree downhill, but is preferably fixed at seven degrees uphill. The flow tray 401 also has an opening (not shown) therein. The gate valve 26 of the shale shaker 10 selectively prevents and allows screened drilling mud through the opening. Five intermediate supports 413a, 413b, 423c, 413d and 413e bind the recessed zones 402a to 402e. The flow tray 401 is preferably formed in a mould with composite material, such as KEVLAR™. Only support 413e will be described in detail, although it should be noted that all the structural support members 413a to 413e are as described for structural support member 413e. The support 413 comprises an upstand 417 moulded into the composite flow tray 401 spanning the length of the flow tray 401. The upstand 417 has a strip 415 fixed or integral with the upstand 417. The strip 415 has two sides each having a tapered portion 418 and 419. The taper of each tapered portion 418, 419 is preferably between ten and eighty degrees, and preferably forty-five to seventy degrees and most preferably sixty to seventy degrees from horizontal. Each tapered portion 418 and 419 has therealong a Tshaped member 420 and 421 fixed thereto or integral therewith, with a wear strip 422 and 423 arranged thereon. The wear strips 422 and 423 may made from a hard wearing material such as HDPE A top 425 of the strip 415 lies slightly above the top of the flanged portion 407 and 408 of the flow tray, preferably by 1 to 3 mm. The wear strips 422 and 423 have a chamfered portion 424, and the top 425 of the strip 415 has a slight crown. The chamfered portions 424 provide a smooth transition between the top 425 and the wear strips 422 and 423.

Figure 8:
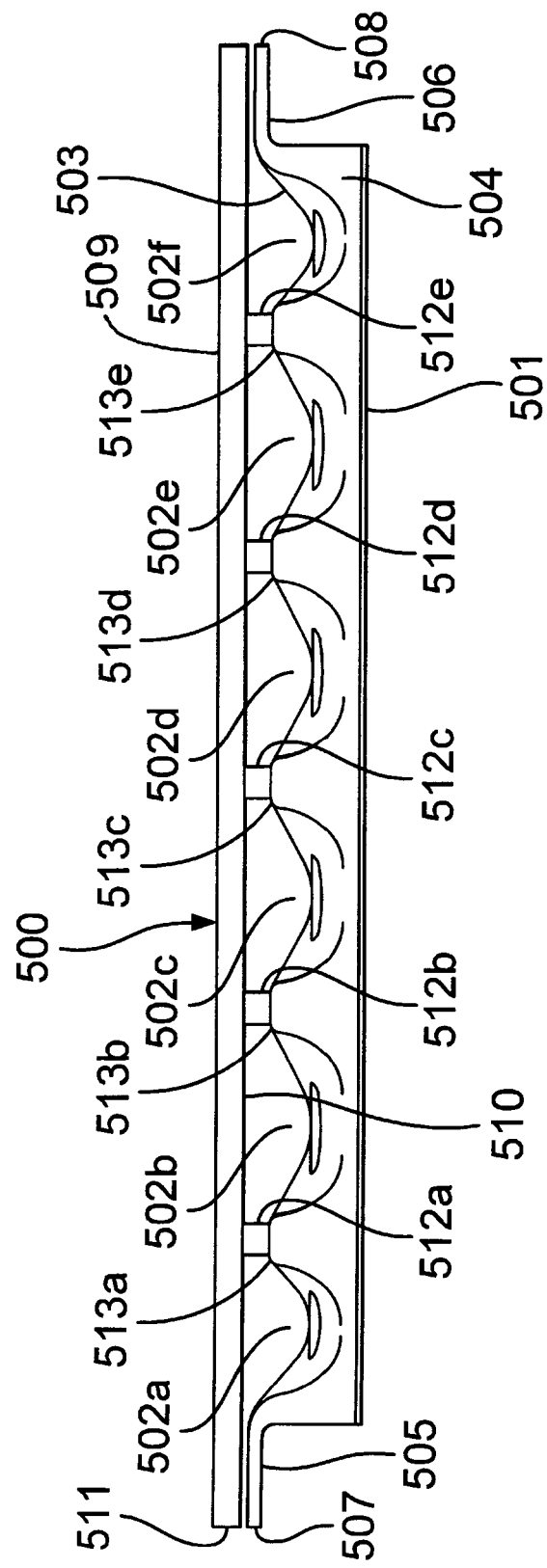
FIG. 8 is a schematic end view of a screen assembly seated on a flow tray.

FIG. 8 shows a screen assembly 500 and a flow tray 501. The flow tray 501 comprises six recessed zones 502a, 502b 502c, 502d, 502e and 502f to facilitate flow of drilling fluid therealong, a far end 503, an open end 504 and a pair of sides 505 and 506. The sides 505 and 506 comprise flanged portions 507 and 508, which flanged portions 507 and 508 are slid into C-shaped channels and in basket and fixed therein, as before described. Preferably, the flanged portions 507 and 508 are glued or otherwise adhered to the C-shaped channels and may be riveted or mechanically fixed, but may be slidably removable from the channels and fixed with the screen assembly 500 by expandable pneumatic hose seal. The recessed zones 502a to 502f have an undulating profile which taper in depth from the far end 503 to the open end 504, which assumes a slope from the discharge end 31 to the feed end 14 of the shale shaker greater than the slope of the screen assembly 500. The slope of the screen assembly may be adjustable between ten degrees uphill and one degree downhill, but is preferably fixed at seven degrees uphill. The flow tray 501 also has an opening (not shown) therein. The gate valve 26 of the shale shaker 10 selectively prevents and allows screened drilling mud through the opening. The screen assembly comprises at least one layer of screening material 509 on a support structure 510. The support structure comprises a frame 511. The flow tray 501 is preferably formed in a mould with a composite material, such as KEVLAR™.

In use, the screen assembly 500 is inserted into the C-shaped channels 109 and 110 above the flow tray 501. Five support ribs 512a to 512e each having a wear strip thereon, are welded, glued or otherwise attached to flat topped crests 513a to 513e of the flow tray. A top surface of the support ribs 512a to 512e preferably lie in a plane which is between 1 and 3 millimeters above from the plane of the top of the flanges 507 and 508. The support structure 510 of the screen assembly 500 sits on five support ribs 512a to 512e. The screen assembly 500 is clamped in place by inflation of the inflatable pneumatic hose 111 in the C-shaped channels 109 and 110. Inflation of the pneumatic hose 111 pushes the sides of the screen assembly 500 on to the flanged portions 507 and 508 of the flow tray 501.

Figure 9A:
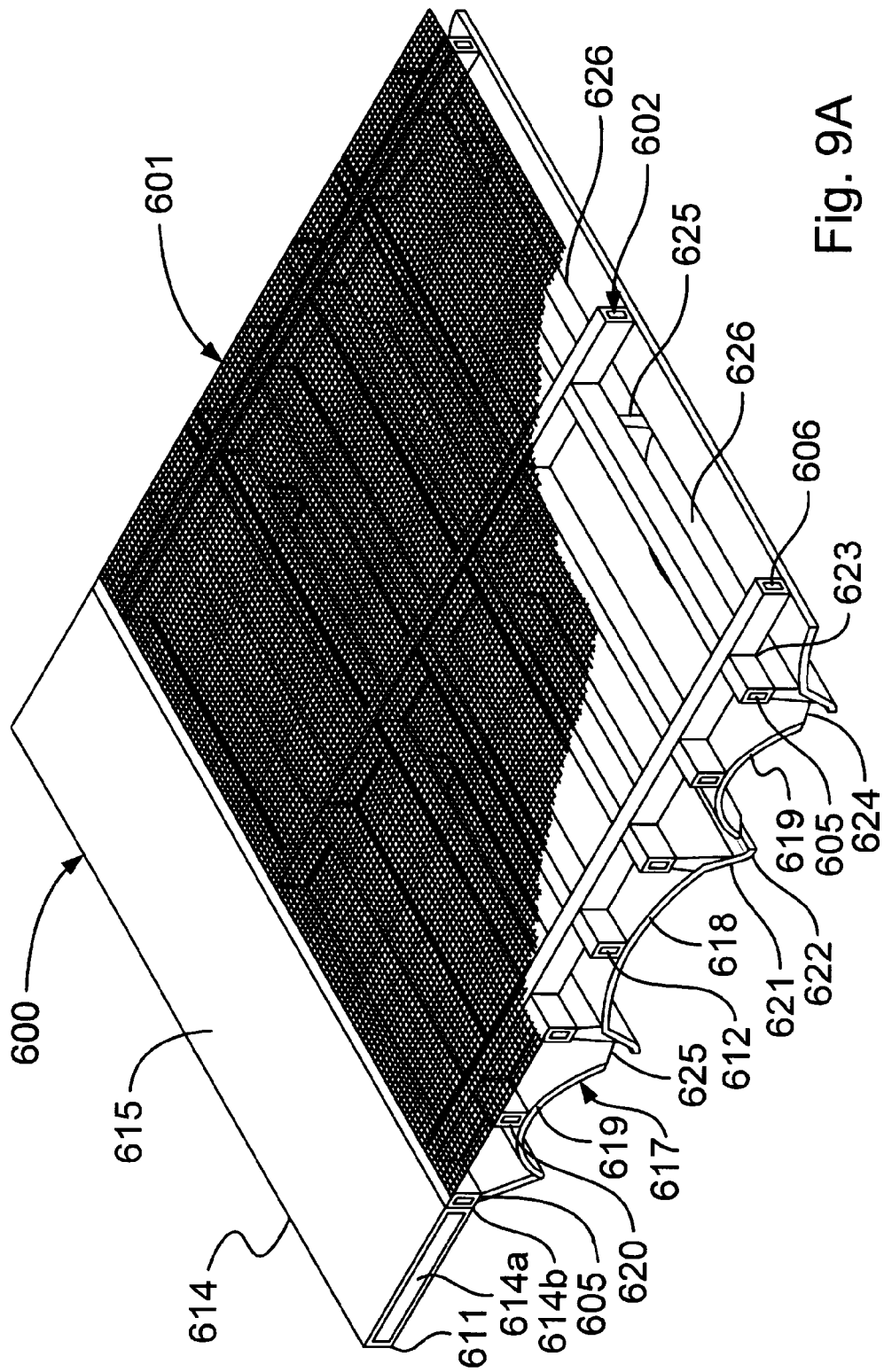
FIG. 9A is a perspective scrap sectional view of a screen assembly in accordance with the present invention, the screen assembly comprising a screening mesh arrangement and a support structure therefor.
Figure 9F:
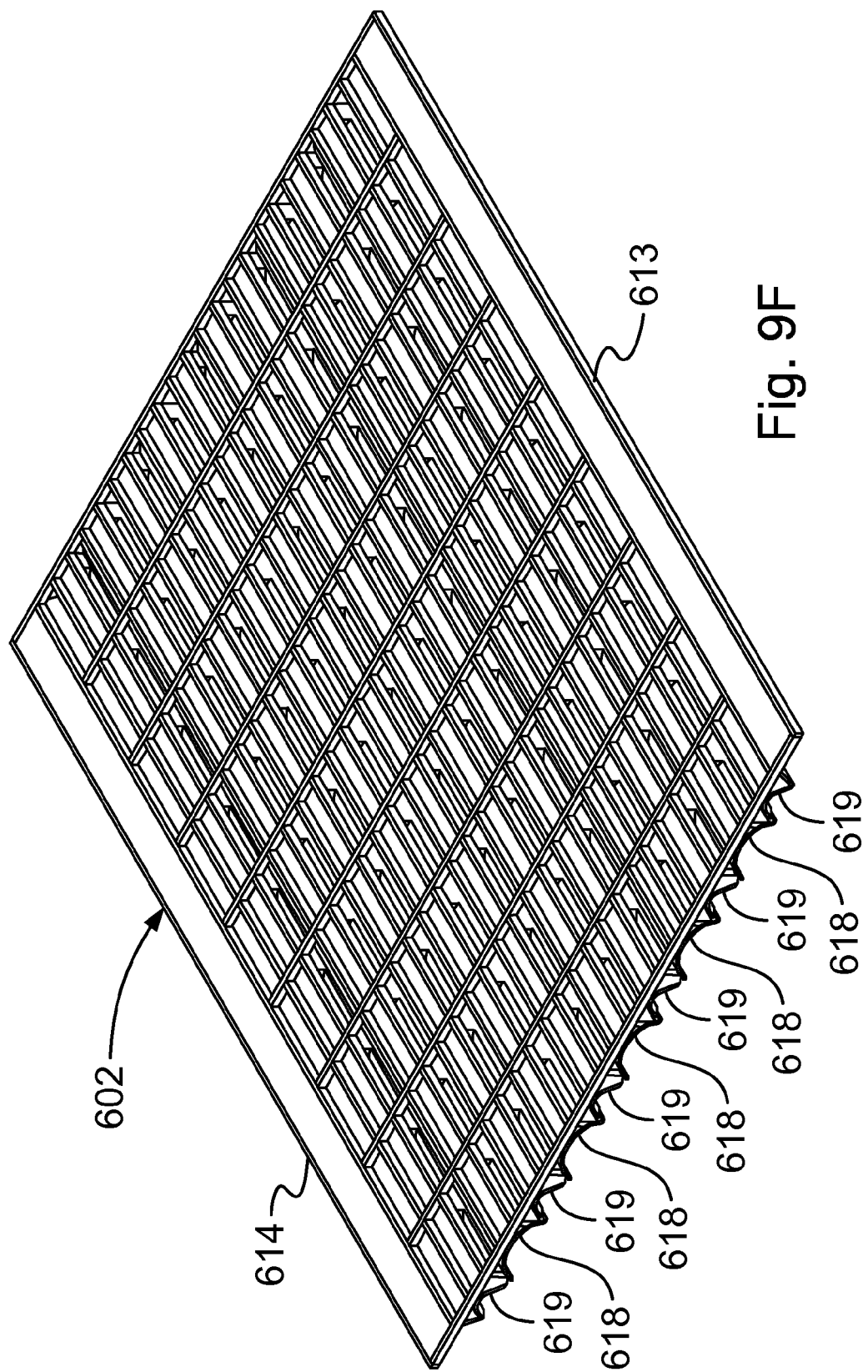
FIG. 9F is a perspective view of the support structure of the screen assembly shown in FIG. 9A.

FIG. 9A shows a part of a screen assembly 600 comprising a screen mesh arrangement 601 and a support structure 602. The screen assembly 600 may be used in place of screen assemblies 100, 200, 300, 500 and be used with flow trays 101, 201, 301, 401, 501 or any other flow tray disclosed herein. The screen assembly 600 may be used in any shale shaker and particularly but not exclusively, any shale shaker disclosed herein. The screen mesh arrangement 601 comprises one layer of fine mesh 603 superimposed on one layer of coarse supporting mesh 604. The one layer of fine screen mesh 603 has fine shute and warp wires and small openings therebetween. The one layer of coarse supporting mesh 604 has shute and warp wires 604a, 604b of a larger diameter than shute and warp wires of the one layer of fine screen mesh 603 and larger openings than the openings in the fine screen mesh. The one layer of fine screen mesh 603 may be adhered or otherwise attached to the one layer of coarse supporting mesh 604. The one layer of fine screen mesh 603 and one layer of coarse supporting mesh 604 are both adhered of otherwise attached to the support structure 602. The one layer of fine screen mesh 603 and one layer of coarse supporting screen mesh 604 are preferably made from a stainless steel material, advantageously 304 stainless steel.

As shown in FIG. 9B, the support structure 602 comprises a plurality of longitudinal support bars 605, preferably twenty-three longitudinal support bars 605 and two longitudinal end members 611 (and not shown) preferably made from a stainless steel and advantageously, a 304 stainless steel material. The preferred cross-sectional dimensions of each of the longitudinal support bars is 6 to 10 mm high and preferably 8 mm high by 1.2 mm to 2 mm wide and preferably 1.6 mm wide. The support structure 602 also comprises a plurality of transverse support bars 606, preferably ten transverse support bars 606 preferably made from a stainless steel and advantageously, a 304 stainless steel material. The preferred cross-sectional dimensions of each of the transverse support bars is 6 to 10 mm high and preferably 8 mm high by 1.2 mm to 2 mm wide and preferably 1.6 mm wide.

The longitudinal support bars 605 preferably have notches 607, open to an underneath face 608 of the longitudinal support bars 605, as shown in FIG. 9C. A notch 607 is provided for each transverse support bar 606. Each transverse support bar 606 has corresponding notches 609 in a top face 610 of each transverse support bar 605. The longitudinal support bar end members 611 (one shown) are fixed, by for example laser welding, to ends of the transverse support bars 606. The longitudinal support bars 605 and transverse support bars 606 slot together, preferably with an interference fit in respective notches 607, 609 to form a rigid grid 612 and then welded at their intersections. Preferably, the top faces 610 of the transverse support bars 606 and top faces 610a, 610b of the longitudinal support bars and longitudinal support bar end members 611 lie in the same plane, thus the rigid grid 612 has a planar top face.

Preferably, box section side portions 613 and 614 are fixed by for example, moulded around the respective longitudinal support bar end members 611 and ends of the transverse support bars 606. The longitudinal support bar end members 611 are preferably form the outermost edge of the screen. The box section side portions 613, 614 are preferably of oblong cross-section, although may be of any suitable cross-section, such as circular, square, rectangular or other multi-sided shape. The box section side portion 614 preferably has a core 614a preferably formed from an expanded foam, although the core may be hollow. An inner face 614b of the box section side portion preferably abuts longitudinal support bar 614b. The box section 613 is preferably a mirror image of box section 614. The box section side portions 613, 614 have a top face 615 which lies in the same plane as a top face 615 of the rigid grid 612, such that during assembly or reconditioning the screen mesh arrangement 601 can be tensioned in a jig (not shown) and offered up to the rigid grid 612 to be attached to the top faces of the longitudinal and transverse support bars 605 and 606 and top face 615 of the box section side portions 613, 614. The box section side portions 613, 614 are preferably moulded from a plastics material and once removed from the mould, the core is filled with an expanded foam or a structural matrix of expanded material.

A corrugated underplate 617 is arranged underneath the rigid grid 612. The corrugated sheet 617 is moulded from a suitable plastics material separately or preferably in the same mould and in the same step as moulding the box section side portions 613 and 614. The corrugated underplate 617 may also comprise metal elements or fibers to add structural strength thereto. The metal elements may be 304 stainless steel and pressed into a corrugated parts and the corrugated sheet moulded thereabout. The corrugated underplate 617 comprises arched portions 618. The arched portions 618 preferably extend the entire length of the screen assembly. Preferably, the arched portions 618 may have tapered portions 618a and an arched top 618b correspondingly formed to sit over strip 415 (see FIG. 7) advantageously, to inhibit lateral movement between the screen assembly 600 and the flow tray 401 and to thus use the flow tray as a stressed member to increase the stiffness of the screen assembly 600. Arched portions 618 are interspaced by arched corrugations 619. The arched corrugations 619 preferably run the entire length of the screen assembly 600. A top 620 of the arched corrugations 619 extends along the length of longitudinal support bars 605 and are preferably welded, moulded or otherwise fixed to the underneath 608 of the longitudinal support bars 605. A foot 621 of the arched corrugations 619 is fixed to a foot 622 of the arched portions 618 which, in use sits over and is supported by strip 415 of the flow tray, and thus the arch corrugations 619 help support the longitudinal support bar 605. The rigid grid 612 is also supported at intersection areas 623 where the transverse support bars 606 intersect with the longitudinal support bars 605 above a trough 624 in the corrugated underplate 617. Upstands 625 are arranged under the longitudinal support bars 605 at the areas of intersection 623 between the underneath 608 of the longitudinal support bars 605 and the troughs 624. The upstands 625 are preferably made from a plastics material and advantageously, moulded in the same step as moulding the box section side portions 613, 614 and the corrugated underplate 617. The upstands may also have a metal core and the core may be of 304 stainless steel.

Between the upstands 625, there are located openings 626 in the corrugated underplate 617. The openings 626 allow screened drilling fluid to pass therethrough on to the flow tray 401 or into a receptacle or other flow means, when in use.

The rigid grid 612 is encapsulated in a plastics material. The encapsulation may simply be a very thin layer of less than 1 mm, or may be a thick layer to make a composite material, wherein the thick layer of plastics material adds to the structural integrity of the support structure. The step of encapsulating the rigid grid 612 is preferably carried out in the same moulding step and in the same mould as when moulding the box section side portions 613, 614 and the corrugated underplate 617. The thickness of the plastics material for the box section side portions 613, 614 and the corrugated underplate 617 may be in the order of 2 mm thick. The screen mesh arrangement 601 may be tensioned in a jig and offered up to the top of the support structure 602 and adhered or otherwise attached thereto.

Figure 10:
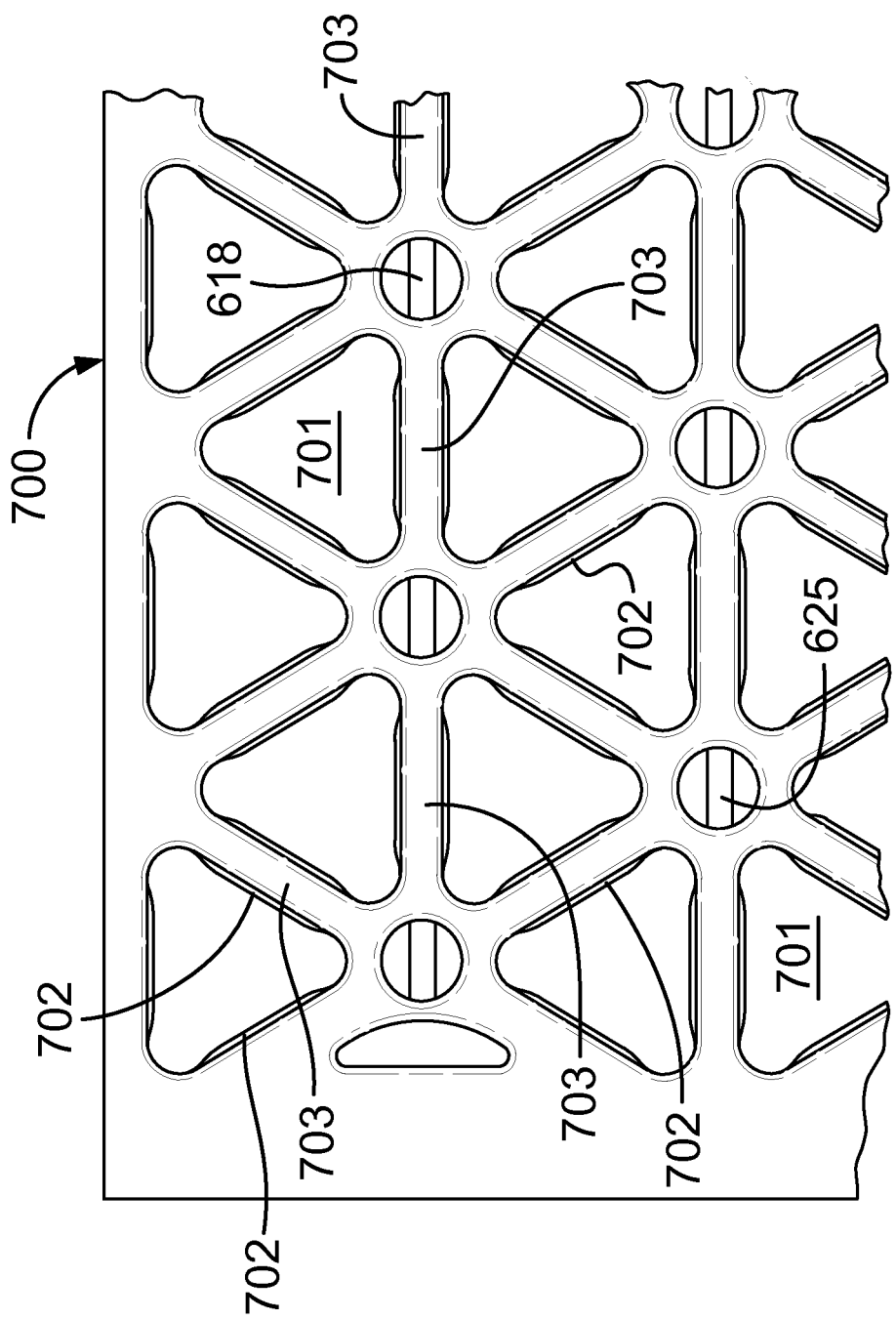
FIG. 10 is a top plan view of an apertured plate with punched openings.

An apertured plate (not shown) may be arranged between the layer of fine screen mesh 603 and the support structure 602, the apertured plate taking the place and function of the coarse screen mesh layer 604. Alternatively, an apertured plate (not shown) may be arranged between the screen mesh arrangement 601 and the support structure 602. Alternatively, an aperture plate 700 shown in FIG. 10 may be used in place of the rigid grid 612. The apertured plate 700 may be similar to the type disclosed in PCT Publication Number WP 2004/0035236 having punched openings 701, the punched openings 701 having tabs 702 either side of ribs 703 which tabs 702 are folded over to form structural tabs 702 to increase the rigidity of the aperture plate 700. The apertured plate 700 is then preferably coated in the plastics material in the same way as described above with respect to the rigid grid 612. The corrugated underplate 617 would be arranged such that ribs of the aperture plate would be supported by the tops of the arched portions 618 and arched corrugations 619 and by upstands 625. The aperture plate 700 is made from a material such as stainless steel and advantageously 304 stainless steel, such that the coefficient of expansion of the aperture plate and the screen mesh arrangement is substantially equal so that differential expansion is inhibited.

The invention claimed is:

1. A screen assembly for a shale shaker, the screen assembly comprising:
a support structure comprising at least one planar layer of screening material disposed thereon, wherein the support structure comprises (1) a plurality of structural members forming a rigid planar grid that define a plurality of openings through the rigid planar grid and (2) a corrugated underplate for supporting the plurality of structural members, wherein the rigid planar grid is positioned between the corrugated underplate and the at least one planar layer of screening material, wherein the rigid planar grid, the corrugated underplate, and the at least one planar layer of screening material each comprise a thermal expansion coefficient, wherein the thermal expansion coefficient of the rigid planar grid is substantially equal to the thermal expansion coefficient of the at least one planar layer of screening material, wherein the corrugated underplate comprises a plurality of peaks and a plurality of curved portions between the plurality of peaks, and wherein the plurality of curved portions are positioned to abut a plurality of wear strips, wherein the plurality of wear strips are coupled to a plurality of upstands that are coupled to a flow tray of the shale shake, wherein each wear strip comprises tapered portions.

2. The screen assembly as claimed in claim 1, wherein the corrugated underplate has a different thermal expansion coefficient than the thermal expansion coefficient of the rigid planar grid and the thermal expansion coefficient of the at least one Planar layer of screening material.

3. The screen assembly as claimed in claim 1, wherein the corrugated underplate has a same thermal expansion coefficient as the thermal expansion coefficient of the rigid planar grid and the thermal expansion coefficient of the at least one planar layer of screening material.

4. The screen assembly as claimed in claim 1, wherein the corrugated underplate comprises planar tapered portions.

5. The screen assembly as claimed in claim 1, wherein the corrugated underplate extends longitudinally with the screen assembly, such that, in use, screened material can flow there along.

6. The screen assembly as claimed in claim 1, wherein the corrugated underplate has a plurality of openings therein to allow screen fluid to flow there through.

7. The screen assembly as claimed in claim 1, wherein the corrugated underplate further comprises at least one arched top formed to sit over a wear strip of the plurality of wear strips.

8. The screen assembly as claimed in claim 1, wherein the at least one planar layer of screening material comprises stainless steel and the plurality of structural members comprise stainless steel.

9. The screen assembly as claimed in claim 1, wherein each of the plurality of structural members comprises bars.

10. The screen assembly as claimed in claim 1, wherein the rigid grid forms an aperture plate.

11. The screen assembly as claimed in claim 1, wherein the corrugated underplate comprises a plastics material.

12. The screen assembly as claimed in claim 1, wherein the support structure is at least one of rectangular, square, and oblong, wherein the support structure comprises a pair of sides, a pair of ends, and a side member on each side of the pair of sides.

13. The screen assembly as claimed in claim 1, wherein the corrugated underplate comprises a plurality of corrugations.

14. The screen assembly as claimed in claim 13, wherein the corrugated underplate further comprises a plurality of arched tops interlaced between the plurality of corrugations.

15. A shale shaker comprising:
a basket for holding at least one screen assembly and a vibratory mechanism, the at least one screen assembly comprising:

a support structure comprising at least one planar layer of screening material disposed thereon, wherein the support structure comprises (1) a plurality of structural members forming a rigid planar grid that define a plurality of openings through the rigid planar grid and (2) a corrugated underplate for supporting the plurality of structural members, wherein the rigid planar grid is positioned between the corrugated underplate and the at least one planar layer of screening material, wherein the rigid planar grid, the corrugated underplate, and the at least one planar layer of screening material each comprise a thermal expansion coefficient, wherein the thermal expansion coefficient of the rigid planar grid is substantially equal to the thermal expansion coefficient of the at least one planar layer of screening material, wherein the corrugated underplate comprises a plurality of peaks and a plurality of curved portions between the plurality of peaks, and wherein the plurality of curved portions are positioned to abut a plurality of wear strips, wherein the plurality of wear strips are coupled to a plurality of upstands that are coupled to a flow tray of the shale shaker, wherein each wear strip comprises tapered portions.

\* \* \* \* \*